United States Patent
Ly et al.

(10) Patent No.: US 11,949,618 B2
(45) Date of Patent: Apr. 2, 2024

(54) DISTORTION PROBING REFERENCE SIGNAL CONFIGURATION

(71) Applicant: QUALCOMM Incorporated, San Diego, CA (US)

(72) Inventors: Hung Dinh Ly, San Diego, CA (US); June Namgoong, San Diego, CA (US); Taesang Yoo, San Diego, CA (US); Krishna Kiran Mukkavilli, San Diego, CA (US); Naga Bhushan, San Diego, CA (US); Tingfang Ji, San Diego, CA (US); Hwan Joon Kwon, San Diego, CA (US); Pavan Kumar Vitthaladevuni, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/194,479

(22) Filed: Mar. 31, 2023

(65) Prior Publication Data

US 2023/0246775 A1 Aug. 3, 2023

Related U.S. Application Data

(63) Continuation of application No. 17/387,248, filed on Jul. 28, 2021, now Pat. No. 11,716,183.

(Continued)

(51) Int. Cl.
*H04L 5/00* (2006.01)
*H04B 17/309* (2015.01)

(52) U.S. Cl.
CPC ......... *H04L 5/0048* (2013.01); *H04B 17/309* (2015.01)

(58) Field of Classification Search
CPC .............................. H04L 5/0048; H04B 17/309
See application file for complete search history.

(56) References Cited

U.S. PATENT DOCUMENTS

2018/0097594 A1* 4/2018 Wang .................... H04L 5/0048
2019/0349998 A1 11/2019 Bhattad et al.
(Continued)

FOREIGN PATENT DOCUMENTS

WO WO-9636144 A1 11/1996
WO WO-2021260659 A1 12/2021

*Primary Examiner* — Duc C Ho
(74) *Attorney, Agent, or Firm* — Holland & Hart LLP

(57) ABSTRACT

Methods, systems, and devices for wireless communications are described. A configuration for a reference signal used to determine a non-linear behavior of transmission components at a transmitting device may be determined. The configuration for the reference signal may be determined based on signaling transmitted by the transmitting device, signaling transmitted by a device that receives the reference signal, or both. Additionally, or alternatively, the configuration for the reference signal may be determined based on a configuration of other signals transmitted by the transmitting device prior to or concurrently with the transmission of the reference signal. The determined configuration may be used to generate and transmit the reference signal or to determine a configuration of a received reference signal. In both cases, a non-linear response of transmission components at the transmitting device may be determined based on the reference signal.

30 Claims, 11 Drawing Sheets

Related U.S. Application Data

(60) Provisional application No. 63/078,757, filed on Sep. 15, 2020.

(56) References Cited

U.S. PATENT DOCUMENTS

| | | | |
|---|---|---|---|
| 2021/0306194 A1* | 9/2021 | Eger | ................... H04L 25/0212 |
| 2022/0085936 A1 | 3/2022 | Ly et al. | |
| 2023/0014042 A1 | 1/2023 | Barak et al. | |

* cited by examiner

DISTORTION PROBING REFERENCE SIGNAL CONFIGURATION

CROSS REFERENCE

The present Application for Patent is a continuation of U.S. patent application Ser. No. 17/387,248 by Ly et al., entitled "DISTORTION PROBING REFERENCE SIGNAL CONFIGURATION," filed Jul. 28, 2021, which claims the benefit of U.S. Provisional Patent Application No. 63/078,757 by Ly et al., entitled "DISTORTION PROBING REFERENCE SIGNAL CONFIGURATION," filed Sep. 15, 2020, each of which is assigned to the assignee hereof, and each of which is expressly incorporated by reference herein.

FIELD OF TECHNOLOGY

The following relates to wireless communications, including configuring a distortion probing reference signal.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless device (e.g., a UE or base station) may transmit a signal using transmission components that include both linear and non-linear operating regions. In some examples, the wireless device may limit characteristics of a transmission to ensure that the transmission components are operated primarily (e.g., solely) within the linear operating region.

SUMMARY

The described techniques relate to improved methods, systems, devices, and apparatuses that support distortion probing reference signal configuration. A configuration for a reference signal used to determine a non-linear behavior of transmission components at a transmitting device may be determined. The configuration for the reference signal may be determined based on signaling transmitted by the transmitting device, signaling transmitted by a device that receives the reference signal, or both. Additionally, or alternatively, the configuration for the reference signal may be determined based on a configuration of other signals transmitted by the transmitting device prior to or concurrently with the transmission of the reference signal. The determined configuration may be used to generate and transmit the reference signal or to determine a configuration of a received reference signal. In both cases, a non-linear response of transmission components at the transmitting device may be determined based on the reference signal.

A method for wireless communication at a transmitting device is described. The method may include determining a configuration for a distortion probing reference signal, generating, based on the configuration, the distortion probing reference signal using a sequence associated with a peak-to-average power ratio, where a transmission component at the transmitting device operates in a non-linear operating region based on the peak-to-average power ratio, and transmitting the generated distortion probing reference signal, the distortion probing reference signal associated with the peak-to-average power ratio.

An apparatus for wireless communication at a transmitting device is described. The apparatus may include a processor, memory coupled with the processor, and instructions stored in the memory. The instructions may be executable by the processor to cause the apparatus to determine a configuration for a distortion probing reference signal, generating, base at least in part on the configuration, the distortion probing reference signal using a sequence associated with a peak-to-average power ratio, where a transmission component at the transmitting device operates in a non-linear operating region based on the peak-to-average power ratio, and transmit the generated distortion probing reference signal, the distortion probing reference signal associated with the peak-to-average power ratio.

Another apparatus for wireless communication at a transmitting device is described. The apparatus may include means for determining a configuration for a distortion probing reference signal, means for generating, based on the configuration, the distortion probing reference signal using a sequence associated with a peak-to-average power ratio, where a transmission component at the transmitting device operates in a non-linear operating region based on the peak-to-average power ratio, and means for transmitting the generated distortion probing reference signal, the distortion probing reference signal associated with the peak-to-average power ratio.

A non-transitory computer-readable medium storing code for wireless communication at a transmitting device is described. The code may include instructions executable by a processor to determine a configuration for a distortion probing reference signal, generating, base at least in part on the configuration, the distortion probing reference signal using a sequence associated with a peak-to-average power ratio, where a transmission component at the transmitting device operates in a non-linear operating region based on the peak-to-average power ratio, and transmit the generated distortion probing reference signal, the distortion probing reference signal associated with the peak-to-average power ratio.

Some examples of the method, apparatuses, and non-transitory computer-readable medium described herein may further include operations, features, means, or instructions for determining a non-linear response of the transmission component based on the distortion probing reference signal.

Some examples of the method, apparatuses, and non-transitory computer-readable medium described herein may further include operations, features, means, or instructions for receiving an indication of a waveform type for the distortion probing reference signal, where the configuration for the distortion probing reference signal may be based on the waveform type.

In some examples of the method, apparatuses, and non-transitory computer-readable medium described herein, the indication of the waveform type may be received in a system information message, a medium access control channel element, a downlink control information message, a radio resource control message, a random access channel message, or any combination thereof.

Some examples of the method, apparatuses, and non-transitory computer-readable medium described herein may further include operations, features, means, or instructions for selecting a waveform type for the distortion probing reference signal, where the configuration for the distortion probing reference signal may be based on the waveform type and indicating, to a receiving device, the waveform type selected by the transmitting device.

In some examples of the method, apparatuses, and non-transitory computer-readable medium described herein, indicating the waveform type may include operations, features, means, or instructions for transmitting an indication of the waveform type in a system information message, a medium access control channel element, a downlink control information message, a radio resource control message, a random access channel message, or any combination thereof.

In some examples of the method, apparatuses, and non-transitory computer-readable medium described herein, indicating the waveform type may include operations, features, means, or instructions for transmitting an indication of the waveform type in a random access channel message, an uplink control information message, or any combination thereof.

Some examples of the method, apparatuses, and non-transitory computer-readable medium described herein may further include operations, features, means, or instructions for determining a first waveform type for signals transmitted using a data channel, a second waveform type for signals transmitted using a control channel, or both, where the configuration for the distortion probing reference signal may be based on the first waveform type or the second waveform type.

Some examples of the method, apparatuses, and non-transitory computer-readable medium described herein may further include operations, features, means, or instructions for determining a first numerology for signals transmitted using a data channel in a bandwidth part, a second numerology for signals transmitted using a control channel in the bandwidth part, a third numerology for reference signals transmitted in the bandwidth part, or any combination thereof, where the configuration for the distortion probing reference signal may be based on the first numerology, the second numerology, or the third.

Some examples of the method, apparatuses, and non-transitory computer-readable medium described herein may further include operations, features, means, or instructions for activating a first bandwidth part and a second bandwidth part for communications and determining a first numerology for signals transmitted using a data channel in the first bandwidth part, a second numerology for signals transmitted using a control channel in the first bandwidth part, a third numerology for reference signals transmitted in the first bandwidth part, or any combination thereof, where the configuration for the distortion probing reference signal may be based on the first numerology, the second numerology, or the third numerology, and the distortion probing reference signal may be transmitted in the first bandwidth part.

In some examples of the method, apparatuses, and non-transitory computer-readable medium described herein, the first numerology associated with the first bandwidth part may be different from the second numerology associated with the second bandwidth part.

Some examples of the method, apparatuses, and non-transitory computer-readable medium described herein may further include operations, features, means, or instructions for activating a first bandwidth part and a second bandwidth part for communications, determining a first numerology for signals transmitted using a data channel in the first bandwidth part, a second numerology for signals transmitted using a control channel in the first bandwidth part, a third numerology for reference signals transmitted in the first bandwidth part, or any combination thereof, determining a fourth numerology for signals transmitted using the data channel in the second bandwidth part, a fifth numerology for signals transmitted using the control channel in the second bandwidth part, a sixth numerology for reference signals transmitted in the second bandwidth part, or any combination thereof, where the configuration for the distortion probing reference signal may be based on the first numerology, the second numerology, the third numerology, the fourth numerology, the fifth numerology, or the sixth numerology, and where transmitting the distortion probing reference signal includes transmitting a first component of the distortion probing reference signal based on the first numerology, the second numerology, or the third numerology for transmission in the first bandwidth part, and transmitting a second component of the distortion probing reference signal based on the fourth numerology, the fifth numerology, or the sixth numerology for transmission in the second bandwidth part.

Some examples of the method, apparatuses, and non-transitory computer-readable medium described herein may further include operations, features, means, or instructions for determining a synchronization signal block index configured for a receiving device, where the configuration for the distortion probing reference signal may be based on the synchronization signal block index and the distortion probing reference signal may be transmitted using a transmission spatial domain filter corresponding to the synchronization signal block index.

Some examples of the method, apparatuses, and non-transitory computer-readable medium described herein may further include operations, features, means, or instructions for determining a first correspondence between a control channel and a first reference signal, a second correspondence between a data channel and a second reference signal, or both based on a transmission configuration indicator.

Some examples of the method, apparatuses, and non-transitory computer-readable medium described herein may further include operations, features, means, or instructions for indicating, to a receiving device, that the first reference signal corresponds to the distortion probing reference signal based on the first correspondence between the control channel and the first reference signal and indicating, to the receiving device, that the second reference signal corresponds to the distortion probing reference signal based on the second correspondence between the data channel and the second reference signal.

Some examples of the method, apparatuses, and non-transitory computer-readable medium described herein may further include operations, features, means, or instructions for indicating, to a receiving device, a third correspondence between the distortion probing reference signal and a third reference signal.

Some examples of the method, apparatuses, and non-transitory computer-readable medium described herein may further include operations, features, means, or instructions for determining a first set of spatial filtering coefficients for signals transmitted using a data channel, a second set of spatial filtering coefficients for signals transmitted using a control channel, or both, where the configuration for the distortion probing reference signal may be based on the first set of spatial filtering coefficients or the second set of spatial filtering coefficients.

Some examples of the method, apparatuses, and non-transitory computer-readable medium described herein may further include operations, features, means, or instructions for determining a set of one or more spatial filtering coefficients for signals transmitted using a random access channel, where the configuration for the distortion probing reference signal may be based on the set of spatial filtering coefficients.

Some examples of the method, apparatuses, and non-transitory computer-readable medium described herein may further include operations, features, means, or instructions for receiving an indication of a set of one or more spatial filtering coefficients for the distortion probing reference signal, where the configuration for the distortion probing reference signal may be based on the set of spatial filtering coefficients.

A method for wireless communication at a receiving device is described. The method may include determining a configuration for a distortion probing reference signal, receiving, based on the configuration, the distortion probing reference signal from a transmitting device, the distortion probing reference signal including a peak-to-average power ratio associated with a non-linear operating region of a transmitting component, and determining a non-linear response of a transmission component of the transmitting device based on the distortion probing reference signal.

An apparatus for wireless communication at a receiving device is described. The apparatus may include a processor, memory coupled with the processor, and instructions stored in the memory. The instructions may be executable by the processor to cause the apparatus to determine a configuration for a distortion probing reference signal, receive, based on the configuration, the distortion probing reference signal from a transmitting device, the distortion probing reference signal including a peak-to-average power ratio associated with a non-linear operating region of a transmitting component, and determine a non-linear response of a transmission component of the transmitting device based on the distortion probing reference signal.

Another apparatus for wireless communication at a receiving device is described. The apparatus may include means for determining a configuration for a distortion probing reference signal, means for receiving, based on the configuration, the distortion probing reference signal from a transmitting device, the distortion probing reference signal including a peak-to-average power ratio associated with a non-linear operating region of a transmitting component, and means for determining a non-linear response of a transmission component of the transmitting device based on the distortion probing reference signal.

A non-transitory computer-readable medium storing code for wireless communication at a receiving device is described. The code may include instructions executable by a processor to determine a configuration for a distortion probing reference signal, receive, based on the configuration, the distortion probing reference signal from a transmitting device, the distortion probing reference signal including a peak-to-average power ratio associated with a non-linear operating region of a transmitting component, and determine a non-linear response of a transmission component of the transmitting device based on the distortion probing reference signal.

Some examples of the method, apparatuses, and non-transitory computer-readable medium described herein may further include operations, features, means, or instructions for transmitting an indication of a waveform type for the distortion probing reference signal, where the configuration for the distortion probing reference signal may be based on the waveform type.

Some examples of the method, apparatuses, and non-transitory computer-readable medium described herein may further include operations, features, means, or instructions for receiving an indication of a waveform type for the distortion probing reference signal, where the configuration for the distortion probing reference signal may be based on the waveform type.

Some examples of the method, apparatuses, and non-transitory computer-readable medium described herein may further include operations, features, means, or instructions for determining a first waveform type for signals transmitted using a data channel, a second waveform type for signals transmitted using a control channel, or both, where the configuration for the distortion probing reference signal may be based on the first waveform type or the second waveform type.

Some examples of the method, apparatuses, and non-transitory computer-readable medium described herein may further include operations, features, means, or instructions for determining a first numerology for signals transmitted using a data channel in a bandwidth part, a second numerology for signals transmitted using a control channel in the bandwidth part, a third numerology for reference signals transmitted in the bandwidth part, or any combination thereof, where the configuration for the distortion probing reference signal may be based on the first numerology, the second numerology, or the third numerology.

Some examples of the method, apparatuses, and non-transitory computer-readable medium described herein may further include operations, features, means, or instructions for activating a first bandwidth part and a second bandwidth part for communications and determining a first numerology for signals transmitted using a data channel in the first bandwidth part, a second numerology for signals transmitted using a control channel in the first bandwidth part, a third numerology for reference signals transmitted in the first bandwidth part, or any combination thereof, where the configuration for the distortion probing reference signal may be based on the first numerology, the second numerology, or the third numerology, and the distortion probing reference signal may be received in the first bandwidth part.

Some examples of the method, apparatuses, and non-transitory computer-readable medium described herein may further include operations, features, means, or instructions for activating a first bandwidth part and a second bandwidth part for communications, determining a first numerology for signals transmitted using a data channel in the first bandwidth part, a second numerology for signals transmitted using a control channel in the first bandwidth part, a third numerology for reference signals transmitted in the first bandwidth part, or any combination thereof, and determining a fourth numerology for signals transmitted using the data channel in the second bandwidth part, a fifth numerology for signals transmitted using the control channel in the second bandwidth part, a sixth numerology for reference signals transmitted in the second bandwidth part, or any combination thereof, where the configuration for the distortion probing reference signal may be based on the first numerology, the second numerology, the third numerology, the fourth numerology, the fifth numerology, or the sixth numerology.

Some examples of the method, apparatuses, and non-transitory computer-readable medium described herein may further include operations, features, means, or instructions for identifying a synchronization signal block index corresponding to a transmission spatial domain filter and where the distortion probing reference signal may be received based on a quasi-colocation between signals transmitted during the synchronization signal block index and the distortion probing reference signal.

Some examples of the method, apparatuses, and non-transitory computer-readable medium described herein may further include operations, features, means, or instructions for determining a first correspondence between a control channel and a first reference signal, a second correspondence between a data channel and a second reference signal, or both based on a transmission configuration indicator.

Some examples of the method, apparatuses, and non-transitory computer-readable medium described herein may further include operations, features, means, or instructions for determining that the first reference signal corresponds to the distortion probing reference signal based on the first correspondence between the control channel and the first reference signal and determining that the second reference signal corresponds to the distortion probing reference signal based on the second correspondence between the data channel and the first reference signal.

Some examples of the method, apparatuses, and non-transitory computer-readable medium described herein may further include operations, features, means, or instructions for receiving an indication of a third correspondence between the distortion probing reference signal and a third reference signal.

Some examples of the method, apparatuses, and non-transitory computer-readable medium described herein may further include operations, features, means, or instructions for determining a first set of spatial filtering coefficients for signals transmitted using a data channel, a second set of spatial filtering coefficients for signals transmitted using a control channel, a third set of spatial filtering coefficients for signal transmitted using a random access channel, or any combination thereof, where the configuration for the distortion probing reference signal may be based on the first set of spatial filtering coefficients, the second set of spatial filtering coefficients, or the third set of spatial filtering coefficients.

Some examples of the method, apparatuses, and non-transitory computer-readable medium described herein may further include operations, features, means, or instructions for indicating a set of one or more spatial filtering coefficients for the distortion probing reference signal, where the configuration for the distortion probing reference signal may be based on the set of spatial filtering coefficients.

DETAILED DESCRIPTION

Figure 1:
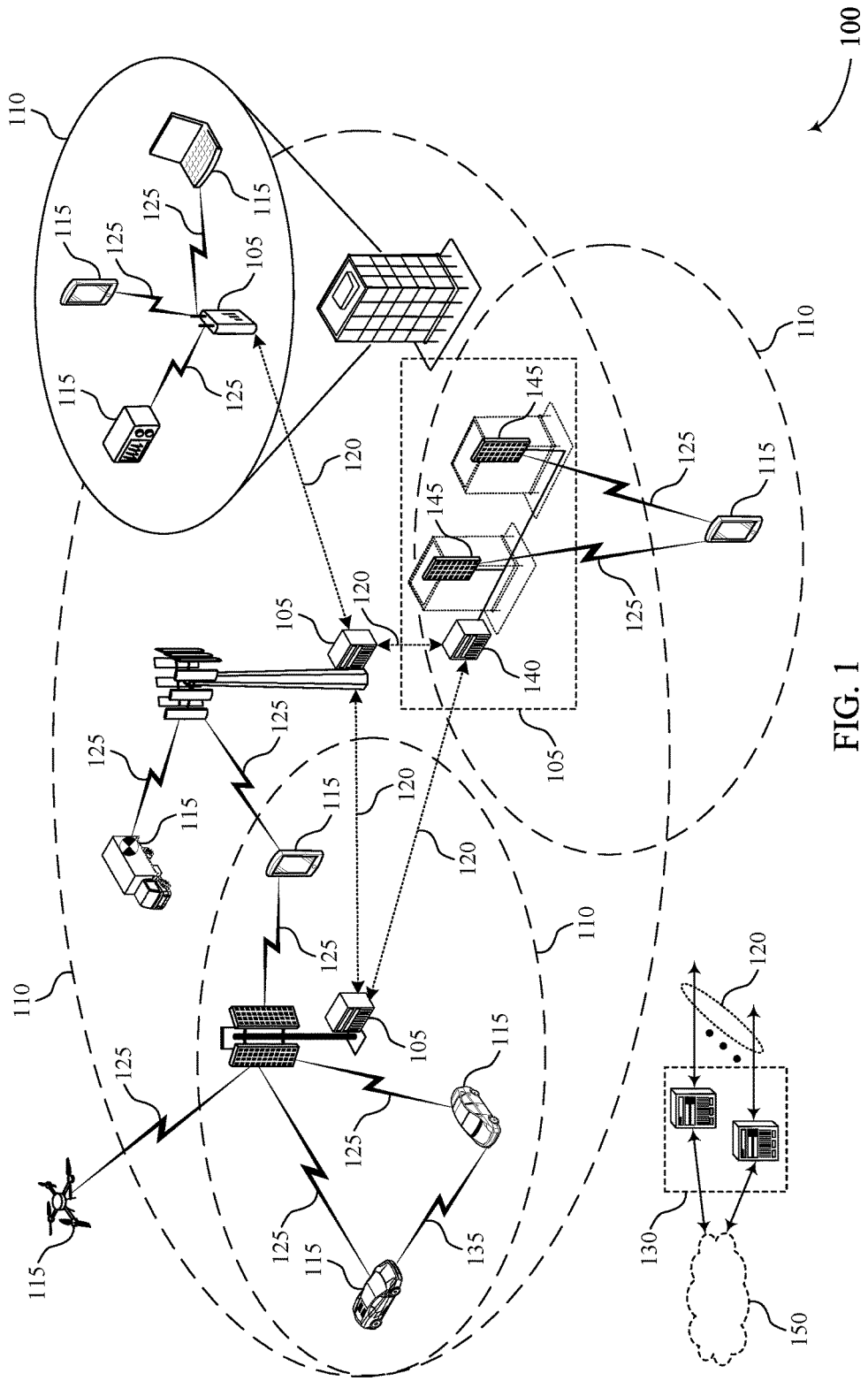
FIG. 1 illustrates an example of a wireless communications system that supports configuring a distortion probing reference signal in accordance with aspects of the present disclosure.

To maintain an operation of transmission components (e.g., a power amplifier, antenna, etc.) at a wireless device within a linear operating region, a transmitting device may limit the power of signals inputted into the transmission components—which may be referred to as operating the transmission components with a power backoff. To facilitate such operation, signals having low peak-to-average-power (PAPR) ratios may be inputted into transmission components. However, limiting the power of signals inputted into transmission components may reduce the efficiency of the transmission components. Distortion probing reference signals (DPRSs) may enable a transmitting device to determine a model for transmission components that describes the behavior of the transmission components while operating in a non-linear region. The model may be used to derive an encoding scheme for the transmitting device, a decoding scheme for the receiving device, or both. The encoding and decoding schemes may be used to compensate for the non-linear behavior of the transmission components. Thus, DPRS transmissions may enable a transmitting device to transmit and a receiving device to receive transmissions that are generated with less (or without) backoff.

Techniques for configuring the transmission parameters (e.g., waveform, numerology, beamforming characteristics) of a DPRS transmission may be unestablished. Similarly, techniques for determining a configuration of the transmission parameters used to transmit a received DPRS may be unestablished.

Thus, techniques for configuring and determining a configuration of transmission parameters for DPRS transmissions may be determined. The techniques may include procedures used to select a configuration for a DPRS transmission and to determine a configuration used for a received DPRS. Additionally, the techniques may include establishing signaling that is used to indicate a configuration for a DPRS transmission or to request a configuration for a DPRS transmission. In some examples, a transmitting device may determine a configuration for a DPRS transmission based on channel conditions. In some examples, a transmitting device determines a configuration for a DPRS transmission based on received configuration signaling. And, in some examples, a transmitting device may determine a configuration for a DPRS transmission based on a configuration of related transmissions (e.g., concurrent data or control channel transmissions). The transmitting device may generate the DPRS in accordance with the determined configuration and transmit the generated DPRS to a receiving device, where a non-linear behavior of transmission components at the transmitting device may be determined based on the transmitted DPRS.

Similarly, a receiving device may determine a configuration of a received DPRS based on determined channel conditions, received configuration signaling, a configuration of related transmissions received at the receiving device, or any combination thereof. The DPRS received at the receiving device may be used by the receiving device to determine a non-linear behavior of the transmission components.

Aspects of the disclosure are initially described in the context of wireless communications systems. Aspects of the disclosure are also described using process flows. Aspects of the disclosure are further illustrated by and described with reference to apparatus diagrams, system diagrams, and flowcharts that relate to distortion probing reference signal configuration.

FIG. 1 illustrates an example of a wireless communications system 100 that supports configuring a distortion probing reference signal in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or another network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread orthogonal frequency division multiplexing (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $\Delta_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Wireless devices (e.g., a base station 105 or UE 115) may use different types of signaling waveforms (e.g., OFDM waveforms) to wirelessly communicate information between one another. For example, wireless devices may use CP-OFDM waveforms to communicate with one another. Additionally, or alternatively, wireless devices may use DFT-s-OFDM waveforms to communicate with one another. Signals transmitted using one waveform type may have different characteristics than signals transmitted using another waveform type—e.g., even when those signals carry the same set of data. For example, signals transmitted using CP-OFDM waveforms may be associated with a higher PAPR than signals transmitted using DFT-s-OFDM waveforms.

A wireless device (e.g., a base station 105 or UE 115) may include a power amplifier that supports transmitting a signal (e.g., by amplifying an input signal) to another wireless device. The power amplifier may have a linear operating region and a non-linear operating region. In the linear operating region, the power amplifier may output signals that are proportional to signals input to the amplifier—e.g., the power amplifier may output signals that are ten times more powerful than the signals input to the amplifier while operating in the linear operating region. In the non-linear operating region, the power amplifier may output signals that are not proportionally related to the signals input to the power amplifier—e.g., the power amplifier may amplify input signals by a factor that is greater than or less than the amplification factor in the linear operating region. The power amplifier may also introduce frequency distortions into the output signal that can lead to interference across subcarriers of a symbol. In some examples, the power amplifier operates in the linear operating region if signals having a signal power within a first power range are inputted into the power amplifier. And the power amplifier operates in the linear operating region if signals having a signal power within a second power range are inputted into the power amplifier.

To increase a reliability of transmissions, the wireless device may apply a backoff to the power amplifier. That is, the wireless device may avoid inputting signals into the power amplifier that may cause the power amplifier to operate in the non-linear region. Thus, the wireless device may primarily operate the power amplifier in the linear region and avoid introducing undesirable frequency components into an OFDM symbol transmission. However, limiting the input range of a power amplifier may result in configuring transmitting devices with inefficient power amplifiers—e.g., because power amplifiers may be operated in a small region of their full operating range.

Reference signals may be used to support communications between wireless devices—e.g., to increase a reliability and/or throughput of communications. In some examples, reference signals (e.g., a demodulation reference signal (DMRS), CSI-RS, sounding reference signal (SRS), etc.) may be used to estimate channel characteristics, including time and frequency-domain responses. In some examples, a reference signal may be used to compensate for non-linearities introduced into a signal by a power amplifier and may be referred to as a DPRS. A DPRS may enable a transmitting device to use a full (or at least larger) operating region of a power amplifier. A DPRS may be generated using a scrambling sequence that is associated with a high PAPR. For high PAPR signals, a difference between an average power of the signal and a peak instantaneous power of the signal may exceed a threshold. One or more DPRS transmissions may be used to train a neural network that models the non-linearity of the power amplifier. A DPRS may be transmitted infrequently in accordance with a radio resource control (RRC) configuration or as triggered by downlink control information (DCI).

In some examples, a transmitting device (e.g., a base station 105 or UE 115) transmits a DPRS and samples (e.g., "sniffs") the transmitted DPRS to train the neural network. After modeling the non-linearity of the power amplifier, the transmitting device may use the neural network to train a second neural network used for encoding information (which may be referred to as a neural network (NN) transmission encoder) and a third neural network for decoding information (which may be referred to as an NN reception decoder). The transmitting device may use the NN transmission encoder to encode information prior to transmission and may signal the NN reception decoder to a receiving device (e.g., a base station 105 or UE 115). The receiving device may receive the encoded transmission using the NN reception decoder. In another example, the transmitting device may transmit the neural network that models the non-linearity of the power amplifier to the receiving device, and the receiving device may use the neural network to determine an NN reception decoder.

Additionally, or alternatively, a transmitting device may transmit a DPRS and a DMRS to a receiving device. The receiving device may use the DMRS to estimate a linear channel between the transmitting and receiving device (without non-linearities introduced by a power amplifier) and may use the DPRS to estimate the channel including the non-linearities introduced by the power amplifier. The receiving device may compare the channel estimates to train a neural network that models the non-linearity of the power amplifier. After modeling the non-linearity of the power amplifier, the receiving device may use the neural network to train a second neural network used for encoding information (which may be referred to as a neural network (NN) transmission encoder) and a third neural network for decoding information (which may be referred to as an NN reception decoder). The receiving device may signal the NN reception encoder to the transmitting device, which may encode transmissions to the receiving device using the NN reception encoder. Also, the receiving device may receive encoded transmissions from the transmitting device using the NN reception decoder. In another example, the receiving device may transmit the neural network that models the non-linearity of the power amplifier to the transmitting device, and the transmitting device may use the neural network to determine an NN encoder.

As described herein, to maintain an operation of transmission components (e.g., a power amplifier, antenna, etc.) that supports signal transmission within a linear operating region, a transmitting device may limit the power of signals inputted into the transmission components. That is, the transmitting device may operate the transmission components with a power backoff. To facilitate such operation, signals having low PAPR ratios may be inputted into transmission components. However, limiting the power of signals inputted into transmission components may reduce the efficiency of the transmission components. As also described herein, distortion probing reference signals (DPRSs) may enable a transmitting device to determine a model for transmission components that describes the behavior of the transmission components while operating in a non-linear region. The model may be used to derive an encoding scheme for the transmitting device, a decoding scheme for the receiving device, or both that compensate for the non-linear behavior of the transmission components. Thus, DPRS transmissions may enable a transmitting device to transmit and a receiving device to receive transmissions that are generated with less (or without) backoff.

Techniques for configuring the transmission parameters (e.g., waveform, numerology, beamforming characteristics) of a DPRS transmission may be unestablished. Similarly, techniques for determining a configuration of the transmission parameters used to transmit a received DPRS may be unestablished.

Thus, techniques for configuring and determining a configuration of transmission parameters for DPRS transmissions may be determined. The techniques may include procedures used to select a configuration for a DPRS transmission and to determine a configured used for a received DPRS. Additionally, techniques may also include establishing signaling that is used to indicate a configuration for a DPRS transmission or to request a configuration for a DPRS transmission. In some examples, a transmitting device determines a configuration for a DPRS based on received configuration signaling. Additionally, or alternatively, a transmitting device may determine a configuration for a DPRS based on a configuration of related transmissions (e.g., data or control channel transmissions). The transmitting device may generate the DPRS in accordance with the determined configuration and transmit the generated DPRS to a receiving device, where a non-linear behavior of transmission components at the transmitting device may be determined based on the transmitted DPRS.

Similarly, a receiving device may determine a configuration of a received DPRS based on received configuration signaling. Additionally, or alternatively, a transmitting device may determine a configuration for a DPRS based on a configuration of related transmissions (e.g., data or control channel transmissions) received at the receiving device. The DPRS received at the receiving device may be used by the receiving device, the transmitting device, or both to determine a non-linear behavior of the transmission components.

Figure 2:
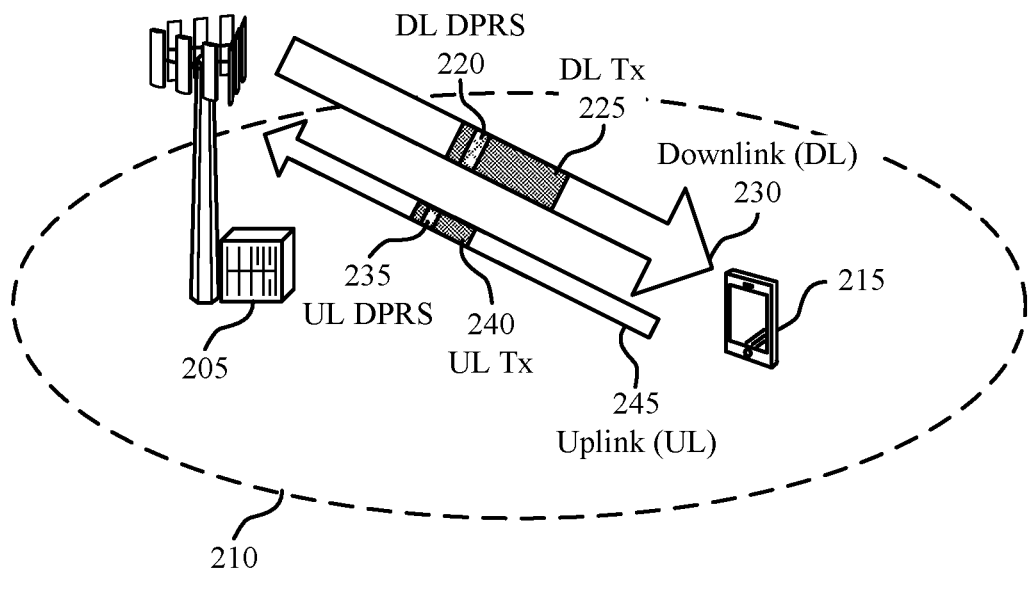
FIG. 2 illustrates an example of a wireless communications subsystem that supports configuring a distortion probing reference signal in accordance with aspects of the present disclosure.

FIG. 2 illustrates an example of a wireless communications subsystem that supports configuring a distortion probing reference signal in accordance with aspects of the present disclosure.

Wireless communications subsystem 200 may include base station 205 and UE 215, which may be examples of a base station and UE described in FIG. 1. Base station 205 and UE 215 may communicate with one another within coverage area 210 as described in FIG. 1.

In some examples, UE 215 includes a power amplifier that is used to transmit wireless communications to other wireless devices, such as base station 205 via uplink 245. UE 215 may also transmit a DPRS (e.g., uplink DPRS 235) to support transmitting signals to base station 205 that have high PAPRs that cause the power amplifier at UE 215 to operate in a non-linear region. UE 215 may configure one or more transmission parameters for transmitting uplink DPRSs to base station 205. In some examples, UE 215 may determine a waveform type to use for transmission of uplink DPRS 235. In some examples, UE 215 transmits uplink DPRS in an CP-OFDM waveform. In other examples, UE 215 transmits uplink DPRS in a DFT-s-OFDM waveform. UE 215 may determine a waveform type to use for transmission of uplink DPRS 235 based on a waveform type requested by base station 205. Or UE 215 may determine a waveform type to use for transmission of uplink DPRS 235 based on a waveform type used for other signals included in uplink transmission 240—e.g., used for a physical uplink control channel (PUCCH) signal, a physical uplink shared channel (PUSCH) signal, an SRS, or the like.

UE 215 may also determine a numerology (e.g., a subcarrier spacing, symbol period, cyclic prefix, etc.) to use for transmission of uplink DPRS 235. In some examples, UE 215 may use the numerology used for transmitting other signals within an active bandwidth part to transmit uplink DPRS 235. For example, UE 215 may use the same numerology as a PUCCH signal, a PUSCH signal, CSI-RS, or the like to transmit uplink DPRS 235. UE 215 may also determine multi-beam parameters (e.g., beamforming weights) for the DPRS. In some examples, UE 215 may use same beamforming weights used for transmitting a PUCCH signal, a PUSCH signal, or a physical random access channel (PRACH) signal. In other examples, UE 215 may use beamforming weights indicated by base station 205 to transmit uplink DPRS 235.

Similarly, base station 205 may transmit downlink DPRS 220 to UE 215 via downlink 230. In some examples, base station 205 may determine a waveform type to use for transmission of downlink DPRS 220. Base station 205 may determine the waveform type for transmission of downlink DPRS 220 based on a waveform type used for other signals included in downlink transmission 225—e.g., used for a physical downlink control channel (PDCCH) signal, a physical downlink shared channel (PDSCH) signal, a CSI-RS, or the like. In some examples, base station 205 may determine the waveform type for transmission of downlink DPRS 220 based on a waveform type requested by UE 215.

Base station 205 may also determine a numerology to use for transmission of downlink DPRS 220. In some examples, base station 205 may use the numerology used for transmitting other signals within an active bandwidth part to transmit downlink DPRS 220 to UE 215. For example, base station 205 may use the same numerology as a PDCCH signal, a PDSCH signal, CSI-RS, or the like to transmit downlink DPRS 220. Base station 205 may also determine multi-beam parameters (e.g., beamforming weights, quasi-colocation (QCL) relationships, etc.) for the DPRS. In some examples, base station 205 may use a same transmission beam (which may also be referred to as a transmission spatial domain filter) for downlink DPRS 220 that corresponds to the transmission spatial domain filter that is associated with the synchronization signal block (SSB) index configured for UE 215. In some examples, base station 205 may indicate (or UE 215 may determine) that a transmission configuration indication (TCI) state indicator for downlink DPRS 220 is the same as a TCI state indicator for another signal in downlink transmission 225. A TCI state indicator may indicate a QCL relationship between one or more reference signals and another transmission. For example, a TCI state indicator may indicate a quasi-colocation relationship between a delay spread determined for a channel using a CSI-RS and a delay spread associated with a received PUCCH signal. In some examples, base station 205 may indicate a separate TCI state indicator for downlink DPRS 220 that indicates a TCI state for base station 205.

Figure 3:
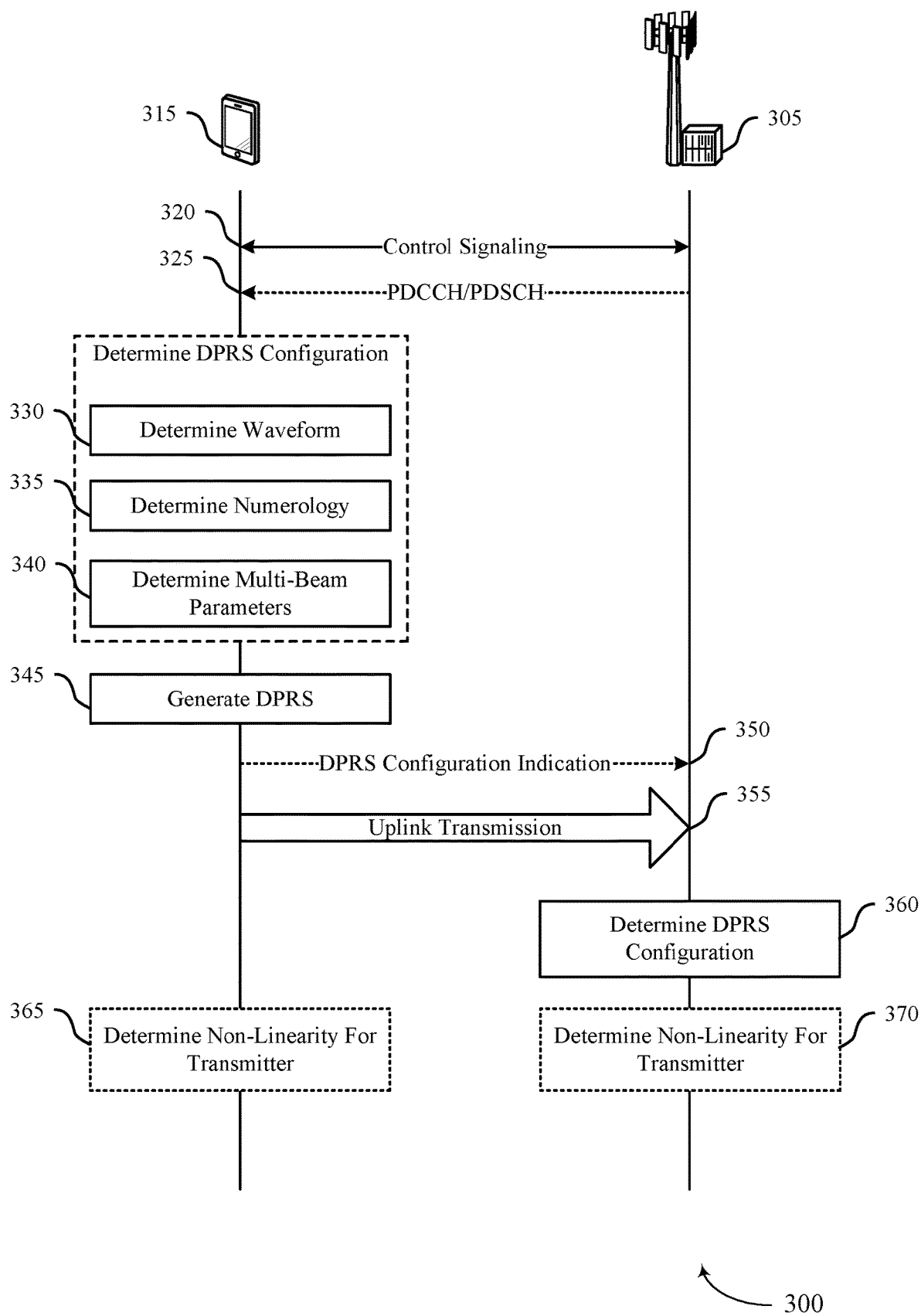
FIGS. 3 and 4 illustrate examples of process flows that support configuring a distortion probing reference signal in accordance with aspects of the present disclosure.

FIG. 3 illustrates an example of a process flow that supports configuring a distortion probing reference signal in accordance with aspects of the present disclosure.

Process flow 300 may be performed by base station 305 and UE 315, which may be examples of a base station or UE in FIGS. 1 and 2. In some examples, process flow 300 illustrates an exemplary sequence of operations performed to support configuring and determining a configuration of a DPRS. For example, process flow 300 depicts operations for transmitting one or more DPRSs from UE 315 to base station 305.

It is understood that one or more of the operations described in process flow 300 may be performed earlier or later in the process, omitted, replaced, supplemented, or performed in combination with another operation. Also, additional operations described herein that are not included in process flow 300 may be included.

At arrow 320, base station 305 and UE 315 may exchange control signaling (e.g., RRC control signaling, PRACH signaling, system information, etc.). In some examples, base station 305 and UE 315 indicate a capability to support DPRS transmission. In some examples, base station 305 may indicate a waveform type (e.g., OFDM or DFT-s-OFM) that UE 315 is to use for DPRS transmissions. In some examples, base station 305 may indicate a waveform type that UE 315 is to use for other signal transmissions (e.g., for PUCCH signal transmissions, PUSCH signal transmissions, SRS transmissions, etc.). In other examples, UE 315 may indicate to base station 305 a waveform type that UE 315 is to use for DPRS transmissions. Base station 305 may also indicate one or more bandwidth parts that are configured for UE 315. Additionally, base station 305 may indicate a set of beamforming weights for DPRS transmission.

At arrow 325, UE 315 may receive control information (e.g., a downlink grant, an uplink grant, etc.) and data from base station 305—e.g., in a control channel and a data channel. In some examples, base station 305 indicates configuration information for DPRS transmission in downlink control information, in a MAC-CE, or both. For example, the base station may include an indication of a waveform type for DPRS transmission, beamforming weights for DPRS transmission, or both. UE 315 may use DPRS configuration information received from base station 305 to determine a configuration for a DPRS transmission.

At block 330, UE 315 may configure a waveform type (e.g., OFDM or DFT-s-OFDM) for a DPRS transmission. In some examples, UE 315 configures the waveform type indicated by base station 305 in prior control signaling. In other examples, UE 315 selects the waveform type for the DPRS transmission without considering explicit signaling from base station 305. For example, UE 315 may select a DFT-s-OFDM waveform type for the DPRS based on being located at a cell edge or identifying an event that triggers a coverage extension. Or UE 115 may select a CP-OFDM waveform type for the DPRS based on a channel between the base station 305 and UE 315 being classified as a good channel (e.g., having an SNR that exceeds a threshold). In some examples, UE 315 may select a waveform type for the DPRS transmission that matches a waveform type used for a data signal transmission—e.g., if a DFT-s-OFDM waveform is used for the data (e.g., PUSCH) signal transmission, then the DFT-s-OFDM waveform may be used for the DPRS transmission. In other examples, UE 315 may select a waveform type for the DPRS transmission that matches a waveform type used for a control (e.g., PUCCH) signal transmission—e.g., if an CP-OFDM waveform is used for the control signal transmission, then the CP-OFDM waveform may be used for the DPRS transmission.

At block 335, UE 315 may configure a numerology (e.g., subcarrier spacing, symbol period, cyclic prefix, etc.) for the DPRS transmission. In some examples, UE 315 identifies an active bandwidth part and determines a numerology used for signals (e.g., data, control, other reference signals, such as SRS, etc.) transmitted in the active bandwidth part. UE 315 may configure the numerology for the DPRS transmission to match the numerology used for the signals transmitted in the active bandwidth part. In some examples, UE 315 may identify multiple active bandwidth parts. In some examples, the DPRS is scheduled to be transmitted over one of the active bandwidth parts, and UE 315 may determine a numerology for signals transmitted within the active bandwidth part scheduled for transmission of the DPRS. UE 315 may use the determined numerology to transmit the DPRS in the active bandwidth part in accordance with the determined numerology.

In other examples, the DPRS is scheduled to be transmitted over multiple of the active bandwidth parts. In such cases, UE 315 may, for example, determine a first numerology for signals transmitted within a first active bandwidth part and a second numerology for signals transmitted within a second active bandwidth part. UE 315 may use the determined numerology to transmit a first DPRS (or a first component of a DPRS) in the first active bandwidth part in accordance with the first numerology and a second DPRS (or a second component of the DPRS) in the second active bandwidth part in accordance with the second numerology.

At block 340, UE 315 may configure multi-beam parameters for the DPRS transmission. In some examples, UE 315 identifies a set of beamforming (or spatial filtering) weights use to transmit a control signal and configures the DPRS to use the same set of beamforming weights. In some examples, UE 315 identifies a set of beamforming (or spatial filtering) weights use to transmit a data signal and configures the DPRS to use the same set of beamforming weights. In some examples, UE 315 identifies a set of beamforming (or spatial filtering) weights use to transmit a random access (e.g., RACH) signal and configures the DPRS to use the same set of beamforming weights. In yet other examples, UE 315 uses a set of beamforming weights for the DPRS transmission that are requested by base station 305 in prior control signaling.

At block 345, UE 315 may generate the DPRS in accordance with the configured transmission parameters. For example, UE 315 may generate the DPRS to use a DFT-s-OFDM waveform, a numerology used by signals transmitted in a first active bandwidth part of multiple active bandwidth parts, and beamforming weights requested by base station 305.

At arrow 350, UE 315 may indicate one or more transmission parameters configured for the DPRS to base station 305. In some examples, UE 315 indicates the waveform type selected by UE 315 for DPRS transmission—e.g., if the waveform type is not selected based on a request from base station 305. In some examples, the indication is transmitted using random access resources. In other examples, the indication is transmitted using control resources (e.g., in an uplink control information message)—e.g., in an uplink transmission that includes the DPRS.

At arrow 355, UE 315 may perform an uplink transmission to base station 305. The uplink transmission may include control signaling (e.g., an uplink control information (UCI) message), data signaling (e.g., a data message), and one or more reference signals (e.g., an SRS).

At block 360, base station 305 may determine a configuration of a DPRS received from UE 315 based on a DPRS configuration indication received from UE 315 and/or characteristics of an uplink transmission received from UE 315. In some examples, base station 305 may determine one or more transmission parameters (e.g., waveform type, numerology, multi-beam parameters, etc.) for the DPRS based on the indication received from UE 315. For example, base station 305 may determine a waveform type used for the DPRS based on the received indication. Base station 305 may also determine one or more transmission parameters based on transmission parameters used for other transmissions received in an uplink transmission. In some examples, base station 305 may determine a waveform type used for the DPRS based on a waveform type used for a control, data, or reference signal included in the uplink transmission (or a prior uplink transmission). For example, base station 305 may determine that the DPRS is transmitted using a waveform type that matches a waveform type used for a PUCCH signal, a PUSCH signal, or an SRS included in the uplink transmission (or a prior uplink transmission).

In some examples, base station 305 may determine a numerology used for the DPRS based on a numerology used to transmit a PUCCH signal in an active bandwidth part. In some examples, base station 305 may determine a numerology used for the DPRS based on a numerology used to transmit a PUSCH signal in an active bandwidth part. Or base station 305 may determine a numerology used for the DPRS based on a numerology used to transmit an SRS in an active bandwidth part. In some examples, multiple bandwidth parts are active and the DPRS is transmitted over one of the active bandwidth parts. In such cases, base station 305 may determine that the DPRS uses a same numerology as a PUCCH signal, PUSCH signal, or SRS signal transmitted in the same bandwidth part as the DPRS. In some examples, UE 315 and/or base station 305 are able to model the non-linearity of the transmission components at UE 315 using the single DPRS. In other examples, multiple bandwidth parts are active and the DPRS is transmitted over multiple of the active bandwidth parts. In such cases, base station 305 may, for example, determine that a first DPRS uses a same numerology as a PUCCH signal, PUSCH signal, or SRS signal transmitted in the first bandwidth part and a second DPRS uses a same numerology as a PUCCH signal, PUSCH signal, or SRS signal transmitted in a second bandwidth part.

Base station 305 may also determine multi-beam characteristics of the DPRS. In some examples, base station 305 determines multi-beam characteristics of the DPRS based on multi-beam characteristics previously requested for the DPRS by base station 305. For example, base station 305 may determine that a first set of beamforming weights are used for the DPRS based on previously requesting the first set of beamforming weights. In some examples, base station 305 determines multi-beam characteristics of the DPRS based on multi-beam characteristics of other signals transmitted in the uplink transmission. For example, base station 305 may determine that the DPRS uses a same set of beamforming weights as a PUCCH signal, PUSCH signal, or SRS included in the uplink transmission (or a prior uplink transmission).

At block 365, UE 315 may determine a model that describes a non-linear behavior of transmission components at UE 315 based on the transmitted DPRS. In some examples, UE 315 may use the transmitted DPRS to refine a neural network that is used to describe the non-linear behavior of the transmission components. UE 315 may use the neural network to generate an encoding scheme that may be used by UE 315 to generate an uplink transmission and decoding scheme that may be used by base station 305 to decode an uplink transmission received from UE 315 while avoiding and/or compensating for non-linearities introduced by transmission components at UE 315.

At block 370, base station 305 may determine a model that describes a non-linear behavior of transmission components at UE 315 based on the transmitted DPRS. In some examples, base station 305 may use the transmitted DPRS to refine a neural network that is used to describe the non-linear behavior of the transmission components. Base station 305 may use the neural network to generate an encoding scheme that may be used by UE 315 to generate an uplink transmission and decoding scheme that may be used by base station 305 to decode an uplink transmission received from UE 315 while avoiding and/or compensating for non-linearities introduced by transmission components at UE 315.

Figure 4:
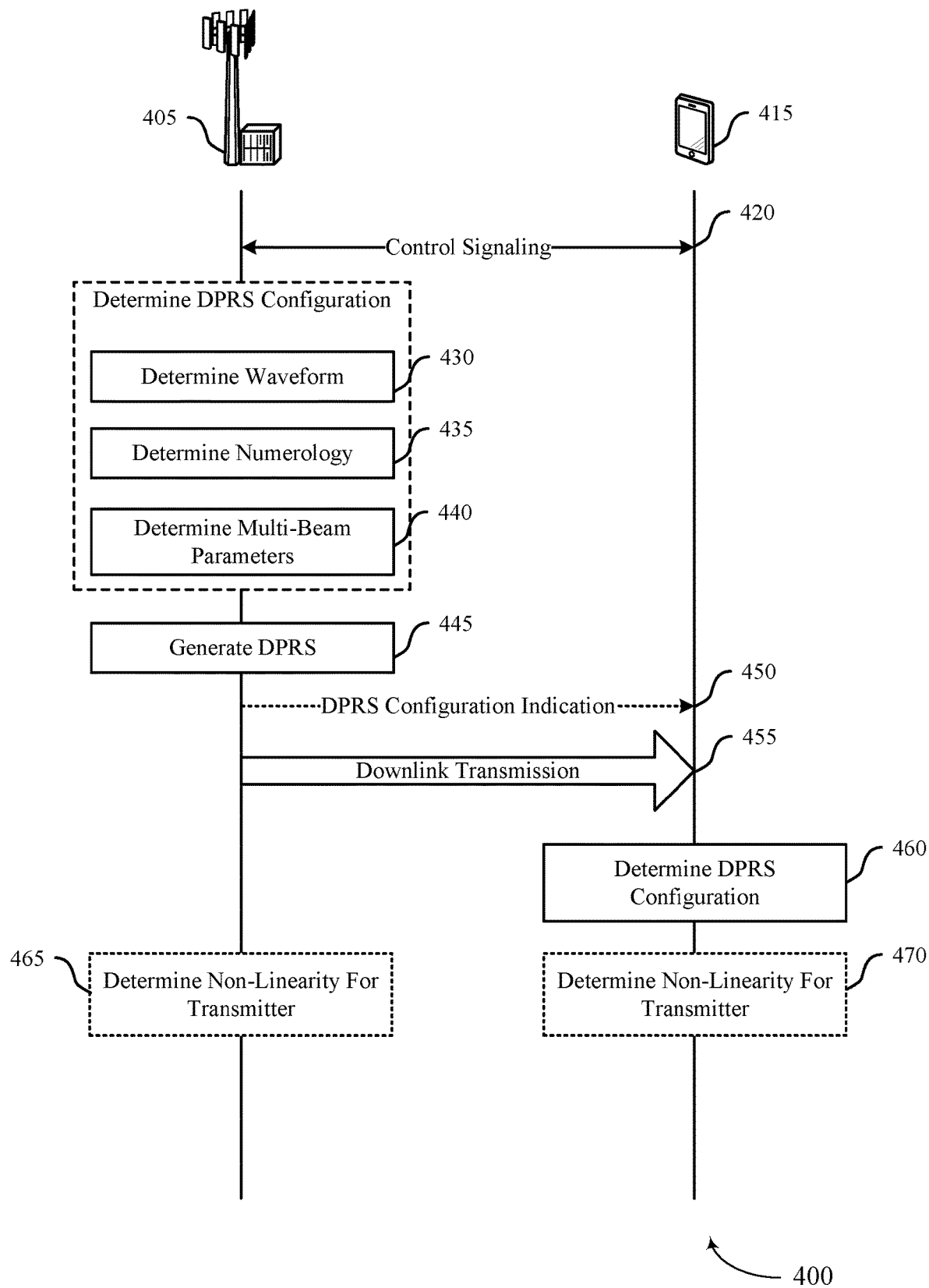

FIG. 4 illustrates an example of a process flow that supports configuring a distortion probing reference signal in accordance with aspects of the present disclosure.

Process flow 400 may be performed by base station 405 and UE 415, which may be examples of a base station or UE described above with reference to FIGS. 1 through 3. In some examples, process flow 400 illustrates an exemplary sequence of operations performed to support configuring and determining a configuration of a DPRS. For example, process flow 400 depicts operations for transmitting one or more DPRSs from base station 405 to UE 415.

It is understood that one or more of the operations described in process flow 400 may be performed earlier or later in the process, omitted, replaced, supplemented, or performed in combination with another operation. Also, additional operations described herein that are not included in process flow 400 may be included.

At arrow 420, base station 405 and UE 415 may exchange control signaling (e.g., RRC control signaling, PRACH signaling, system information, PDCCH/PUCCH signaling, etc.). In some examples, base station 405 and UE 415 indicate a capability to support DPRS transmission. In some examples, base station 405 may indicate a waveform type (e.g., OFDM or DFT-s-OFM) that base station 405 is to use for DPRS transmissions. In some examples, base station 405 may indicate to UE 415 a waveform type that base station 405 is to use for other signal transmissions (e.g., for PDCCH signal transmissions, PDSCH signal transmissions, CSI-RS transmissions, etc.). In other examples, UE 415 may request that base station 405 use a waveform type for DPRS transmissions. Base station 405 may also indicate one or more bandwidth parts that are configured for UE 415.

To support multi-beam communications, base station 405 may transmit multiple synchronization signal blocks that are each associated with a different transmission spatial domain filter. UE 415 may indicate an index of one or more of the synchronization signal blocks that are associated with a transmission spatial domain filter preferred by UE 415. Additionally, base station 405 may configure one or more TCI states at UE 415 to indicate a QCL relationship between a set of reference signals and other signals transmitted from base station 405 to UE 415.

At block 430, base station 405 may configure a waveform type (e.g., OFDM or DFT-s-OFDM) for a DPRS transmission. In some examples, base station 405 configures the waveform type indicated by base station 405 to UE 415 in prior control signaling. In other examples, base station 405 configures the waveform type requested by UE 415 in prior control signaling. In some examples, base station 405 selects a DFT-s-OFDM waveform for the DPRS transmission based on operating in a high frequency band (e.g., a THz band). Otherwise, base station 405 may select a CP-OFDM waveform for the DPRS transmission. In some examples, base station 405 selects a waveform type for the DPRS transmission that matches a waveform type used for a data signal transmission—e.g., if a DFT-s-OFDM waveform is used for the data (e.g., PDSCH) signal transmission, then the DFT-s-OFDM waveform may be used for the DPRS transmission. In other examples, UE 415 may select a waveform type for the DPRS transmission that matches a waveform type used for a control (e.g., PDCCH) signal transmission—e.g., if an CP-OFDM waveform is used for the control signal transmission, then the CP-OFDM waveform may be used for the DPRS transmission.

At block 435, base station 405 may configure a numerology (e.g., subcarrier spacing, symbol period, cyclic prefix, etc.) for the DPRS transmission. In some examples, base station 405 identifies an active bandwidth part and determines a numerology used for signals (e.g., data, control, other reference signals, such as SRS, etc.) transmitted in the active bandwidth part. Base station 405 may configure the numerology for the DPRS transmission to match the numerology used for the signals transmitted in the active bandwidth part. In some examples, base station 405 may identify multiple active bandwidth parts. In some examples, the DPRS is scheduled to be transmitted over one of the active bandwidth parts, and base station 405 may determine a numerology for signals transmitted within the active bandwidth part scheduled for transmission of the DPRS. Base station 405 may use the determined numerology to transmit the DPRS in the active bandwidth part in accordance with the determined numerology.

In other examples, the DPRS is scheduled to be transmitted over multiple of the active bandwidth parts. In such cases, base station 405 may, for example, determine a first numerology for signals transmitted within a first active bandwidth part and a second numerology for signals transmitted within a second active bandwidth part. Base station 405 may use the determined numerology to transmit a first DPRS (or a first component of a DPRS) in the first active bandwidth part in accordance with the first numerology and a second DPRS (or a second component of the DPRS) in the second active bandwidth part in accordance with the second numerology.

At block 440, base station 405 may configure multi-beam parameters for the DPRS transmission. In some examples, base station 405 may transmit the DPRS using a same transmission spatial domain filter that corresponds to an SSB index identified by UE 415. Base station 405 may also configure QCL relationships for the DPRS based on TCI states. In some examples, base station 405 configures the same TCI states for the DPRS as are configured for a control (e.g., PDCCH) signal and/or data signal (e.g., PDSCH). In other examples, base station 405 indicates a separate TCI state for the DPRS from the control and data signaling. The TCI state for the DPRS may indicate a QCL relationship between the DPRS and another reference signal (e.g., a CSI-RS).

At block 445, base station 405 may generate the DPRS in accordance with the configured transmission parameters. For example, base station 405 may generate the DPRS to use an CP-OFDM waveform, a numerology used by signals transmitted in a first active bandwidth part of multiple active bandwidth parts, and a transmission spatial domain filter requested by UE 415.

At arrow 450, base station 405 may indicate one or more transmission parameters configured for the DPRS to UE 415. In some examples, base station 405 indicates the waveform type selected by base station 405 for DPRS transmission—e.g., if the waveform type is not previously indicated to UE 415. In some examples, the indication is transmitted control channel resources. In some example, base station 405 indicates a TCI state for the DPRS transmission.

At arrow 455, base station 405 may perform a downlink transmission to UE 415. The downlink transmission may include control signaling (e.g., a DCI message), data signaling (e.g., a data message), and one or more reference signals (e.g., CSI-RS).

At block 460, UE 415 may determine a configuration of a DPRS received from base station 405 based on a DPRS configuration indication received from base station 405 and/or characteristics of a downlink transmission received from base station 405. In some examples, UE 415 may determine one or more transmission parameters (e.g., waveform type, numerology, multi-beam parameters, etc.) for the DPRS based on the indication received from base station 405. For example, UE 415 may determine a waveform type used for the DPRS based on the received indication. UE 415 may also determine one or more transmission parameters based on transmission parameters used for other transmissions received in a downlink transmission. In some examples, UE 415 may determine a waveform type used for the DPRS based on a waveform type used for a control, data, or reference signal included in the downlink transmission (or a prior downlink transmission). For example, UE 415 may determine that the DPRS is transmitted using a waveform type that matches a waveform type used for a PDCCH signal, a PDSCH signal, or a CSI-RS included in the uplink transmission (or a prior uplink transmission).

In some examples, UE 415 may determine a numerology used for the DPRS based on a numerology used to transmit a PDCCH signal in an active bandwidth part. In some examples, UE 415 may determine a numerology used for the DPRS based on a numerology used to transmit a PDSCH signal in an active bandwidth part. Or UE 415 may determine a numerology used for the DPRS based on a numerology used to transmit a CSI-RS in an active bandwidth part. In some examples, multiple bandwidth parts are active and the DPRS is transmitted over one of the active bandwidth parts. In such cases, UE 415 may determine that the DPRS uses a same numerology as a PDCCH signal, PDSCH signal, or CSI-RS signal transmitted in the same bandwidth part as the DPRS. In some examples, UE 415 and/or base station 405 are able to model the non-linearity of the transmission components at base station 405 using the single DPRS. In other examples, multiple bandwidth parts are active and the DPRS is transmitted over multiple of the active bandwidth parts. In such cases, UE 415 may, for example, determine that a first DPRS uses a same numerology as a PDCCH signal, PDSCH signal, or CSI-RS signal transmitted in the first bandwidth part and a second DPRS uses a same numerology as a PDCCH signal, PDSCH signal, or CSI-RS signal transmitted in a second bandwidth part.

UE 415 may also determine multi-beam characteristics of the DPRS. In some examples, UE 415 determines multi-beam characteristics based on an SSB index previously indicated to base station 405. For example, UE 415 may determine that a transmission spatial domain filter associated with the SSB index is also used to transmit the DPRS. In such cases, UE 415 may determine a QCL relationship between a synchronization signal block having the SSB index and the DPRS. Additionally, or alternatively, UE 415 may also determine QCL relationships between the DPRS and other reference signals transmitted from base station 405. In some examples, UE 415 determines that the DPRS has a same QCL relationship with a reference signal (e.g., a CSI-RS) as a QCL relationship between a PDCCH signal and the reference signal. In some examples, UE 415 determines that the DPRS has a same QCL relationship with a reference signal (e.g., a CSI-RS) as a QCL relationship between a PDSCH signal and the reference signal. In other examples, UE 415 determines that DPRS has a QCL relationship with a reference signal (e.g., a CSI-RS) based on a TCI state that is explicitly signaled for the DPRS—the signaled TCI state may be the same or different from a TCI state for a control and/or data signal transmitted from base station 405.

At block 465, base station 405 may determine a model that describes a non-linear behavior of transmission components at UE 415 based on the transmitted DPRS. In some examples, base station 405 may use the transmitted DPRS to refine a neural network that is used to describe the non-linear behavior of the transmission components. Base station 405 may use the neural network to generate an encoding scheme that may be used by base station 405 to generate a downlink transmission and decoding scheme that may be used by UE 415 to decode a downlink transmission received from base station 405 while avoiding and/or compensating for non-linearities introduced by transmission components at base station 405.

At block 470, UE 415 may determine a model that describes a non-linear behavior of transmission components at base station 405 based on the transmitted DPRS. In some examples, UE 415 may use the transmitted DPRS to refine a neural network that is used to describe the non-linear behavior of the transmission components. UE 415 may use the neural network to generate an encoding scheme that may be used by base station 405 to generate a downlink transmission and decoding scheme that may be used by UE 415 to decode a downlink transmission received from UE 415 while avoiding and/or compensating for non-linearities introduced by transmission components at base station 405.

Figure 5:
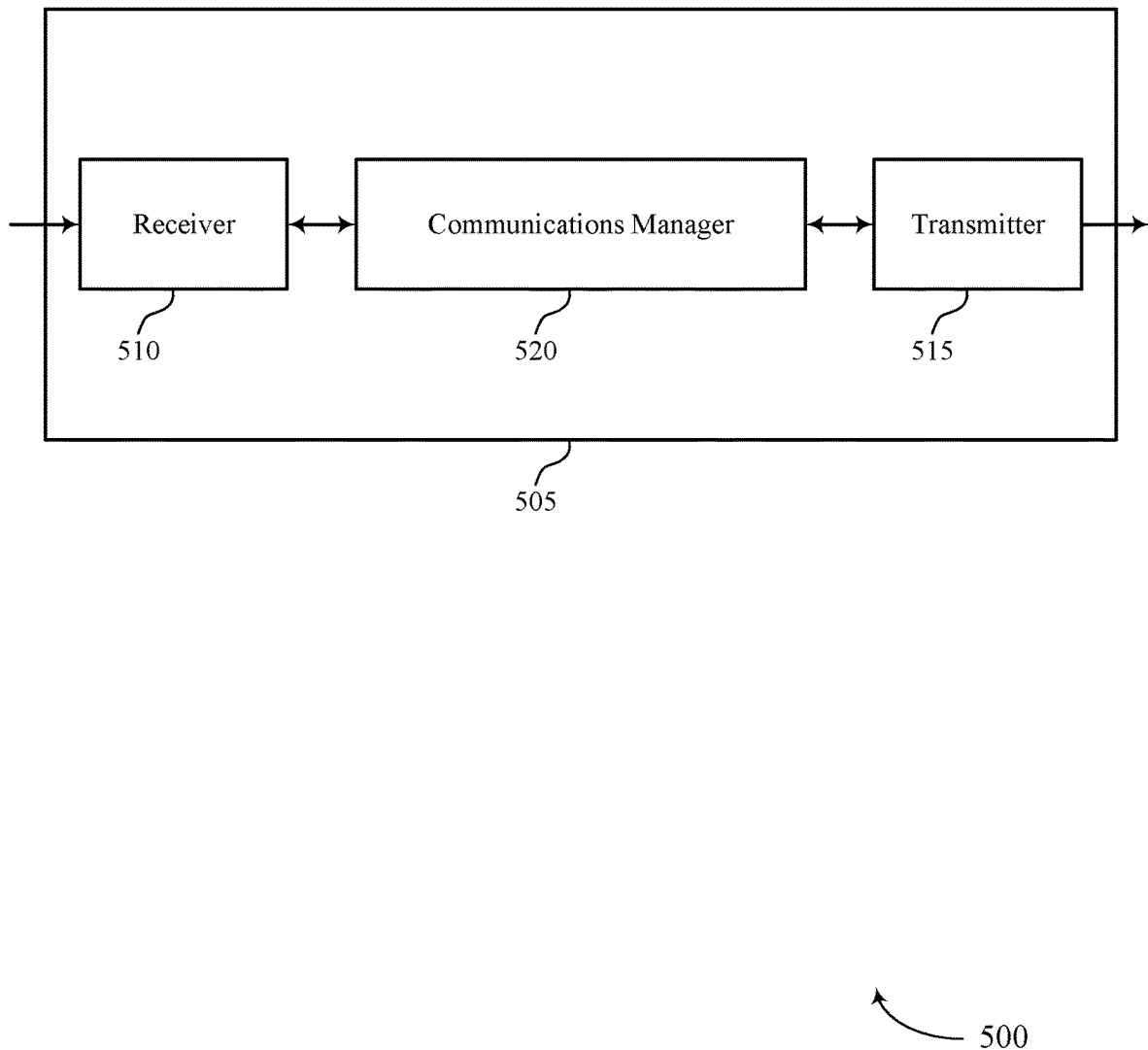
FIGS. 5 and 6 show block diagrams of devices that support distortion probing reference signal configuration in accordance with aspects of the present disclosure.

FIG. 5 shows a block diagram 500 of a device 505 that supports configuring a distortion probing reference signal in accordance with aspects of the present disclosure. The device 505 may be an example of aspects of a UE 115 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, or control information associated with various information channels (e.g., control channels, data channels, information related to distortion probing reference signal configuration). Information may be passed on to other components of the device 505. The receiver 510 may utilize a single antenna or a plurality of antennas.

The transmitter 515 may provide a means for transmitting signals generated by other components of the device 505. In some examples, the transmitter 515 may be co-located with a receiver 510 in a transceiver module. The transmitter 515 may utilize a single antenna or a plurality of antennas.

The communications manager 520, the receiver 510, the transmitter 515, or various combinations thereof or various components thereof, may be an example of a means for performing various aspects of distortion probing reference signal configuration as described herein.

In some examples, the communications manager 520, the receiver 510, the transmitter 515, or various combinations thereof or components thereof, may be implemented in hardware (e.g., in communications management circuitry). The circuitry may include a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described in the present disclosure.

Additionally, or alternatively, in some examples, the communications manager 520, the receiver 510, the transmitter 515, or various combinations thereof or components thereof, may be implemented in code (e.g., as communications management software or firmware) executed by a processor. If implemented in code executed by a processor, the functions of the communications manager 520, the receiver 510, the transmitter 515, or various combinations thereof or components thereof, may be executed by a general-purpose processor, a DSP, a central processing unit (CPU), an ASIC, an FPGA, or some other programmable logic device.

In some examples, the communications manager 520 may be configured to perform various operations (e.g., receiving, monitoring, transmitting) using or otherwise in cooperation with the receiver 510, the transmitter 515, or both.

The communications manager 520 may support wireless communication at a transmitting device in accordance with examples as disclosed herein. For example, the communications manager 520 may be configured to provide or support a means for determining a configuration for a distortion probing reference signal. The communications manager 520 may be configured to provide or support a means for generating, basing at least in part on the configuration, the distortion probing reference signal using a sequence associated with a peak-to-average power ratio, wherein a transmission component at the transmitting device operates in a non-linear operating region based at least in part on the peak-to-average power ratio. The communications manager 520 may be configured to provide or support a means for transmitting the generated distortion probing reference signal, the distortion probing reference signal associated with the peak-to-average power ratio.

The communications manager 520 may support wireless communication at a receiving device in accordance with examples as disclosed herein. For example, the communications manager 520 may be configured to provide or support a means for determining a configuration for a distortion probing reference signal. The communications manager 520 may be configured to provide or support a means for receiving, based at least in part on the configuration, the distortion probing reference signal from a transmitting device, the distortion probing reference signal comprising a peak-to-average power ratio associated with a non-linear operating region of a transmitting component. The communications manager 520 may be configured to provide or support a means for determining a non-linear response of a transmission component of the transmitting device based at least in part on the distortion probing reference signal.

Figure 6:
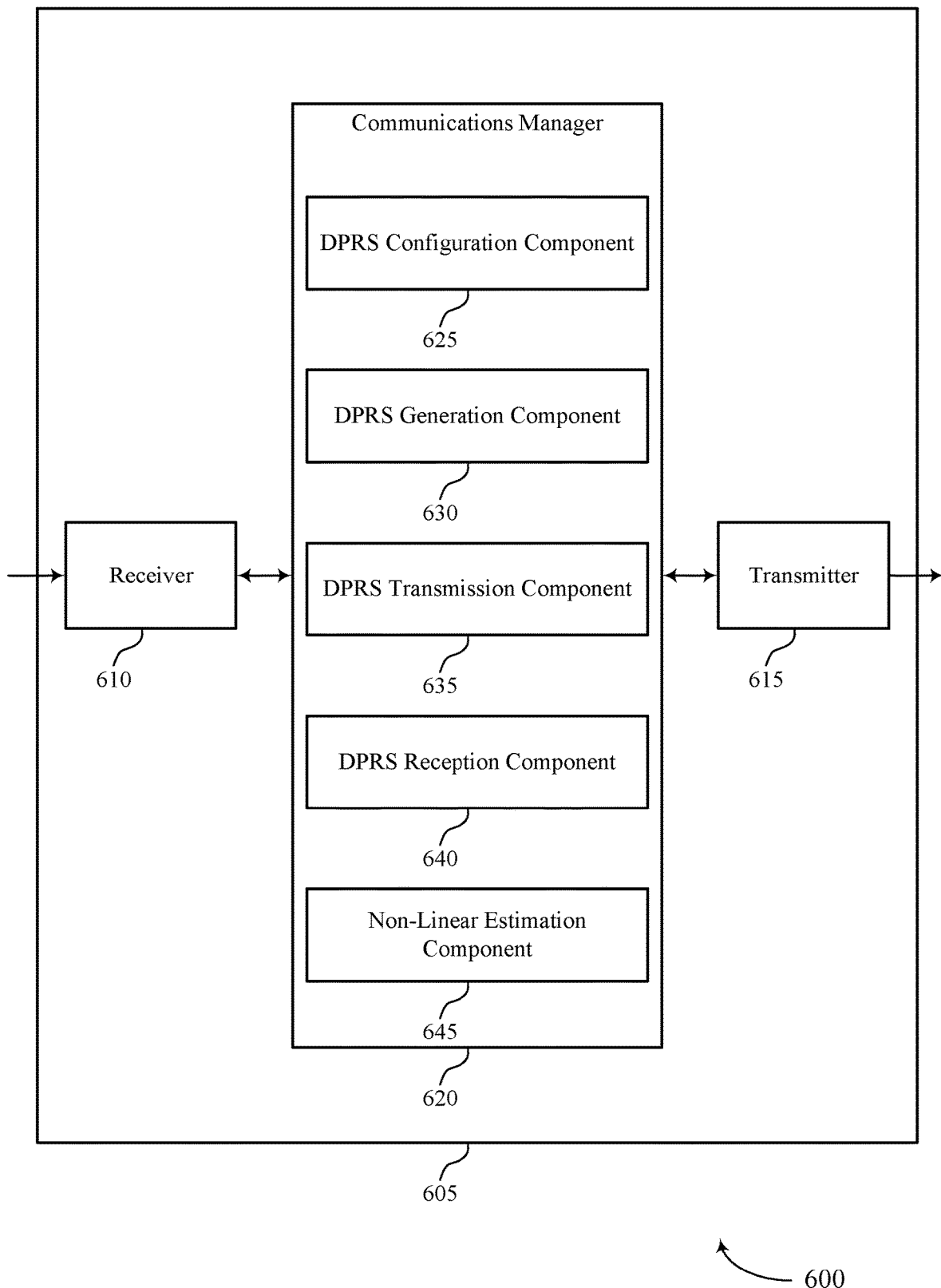

FIG. 6 shows a block diagram 600 of a device 605 that supports configuring a distortion probing reference signal in accordance with aspects of the present disclosure. The device 605 may be an example of aspects of a device 505, a UE 115, or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, or control information associated with various information channels (e.g., control channels, data channels, information related to distortion probing reference signal configuration). Information may be passed on to other components of the device 605. The receiver 610 may utilize a single antenna or a plurality of antennas.

The transmitter 615 may provide a means for transmitting signals generated by other components of the device 605. In some examples, the transmitter 615 may be co-located with a receiver 610 in a transceiver module. The transmitter 615 may utilize a single antenna or a plurality of antennas.

The device 605, or various components thereof, may be an example of means for performing various aspects of distortion probing reference signal configuration as described herein. For example, the communications manager 620 may include an DPRS configuration component 625, an DPRS generation component 630, an DPRS transmission component 635, an DPRS reception component 640, a non-linear estimation component 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both.

The communications manager 620 may support wireless communication at a transmitting device in accordance with examples as disclosed herein. The DPRS configuration component 625 may be configured to provide or support a means for determining a configuration for a distortion probing reference signal. The DPRS generation component 630 may be configured to provide or support a means for generating, based on the configuration, the distortion probing reference signal using a sequence associated with a peak-to-average power ratio, where a transmission component at the transmitting device operates in a non-linear operating region based on the peak-to-average power ratio. The DPRS transmission component 635 may be configured to provide or support a means for transmitting the generated distortion probing reference signal, the distortion probing reference signal associated with the peak-to-average power ratio.

The communications manager 620 may support wireless communication at a receiving device in accordance with examples as disclosed herein. Additionally, or alternatively, the DPRS configuration component 625 may be configured to provide or support a means for determining a configuration for a distortion probing reference signal. The DPRS reception component 640 may be configured to provide or support a means for receiving, based on the configuration, the distortion probing reference signal from a transmitting device, the distortion probing reference signal including a peak-to-average power ratio associated with a non-linear operating region of a transmitting component. The non-linear estimation component 645 may be configured to provide or support a means for determining a non-linear response of a transmission component of the transmitting device based on the distortion probing reference signal.

Figure 7:
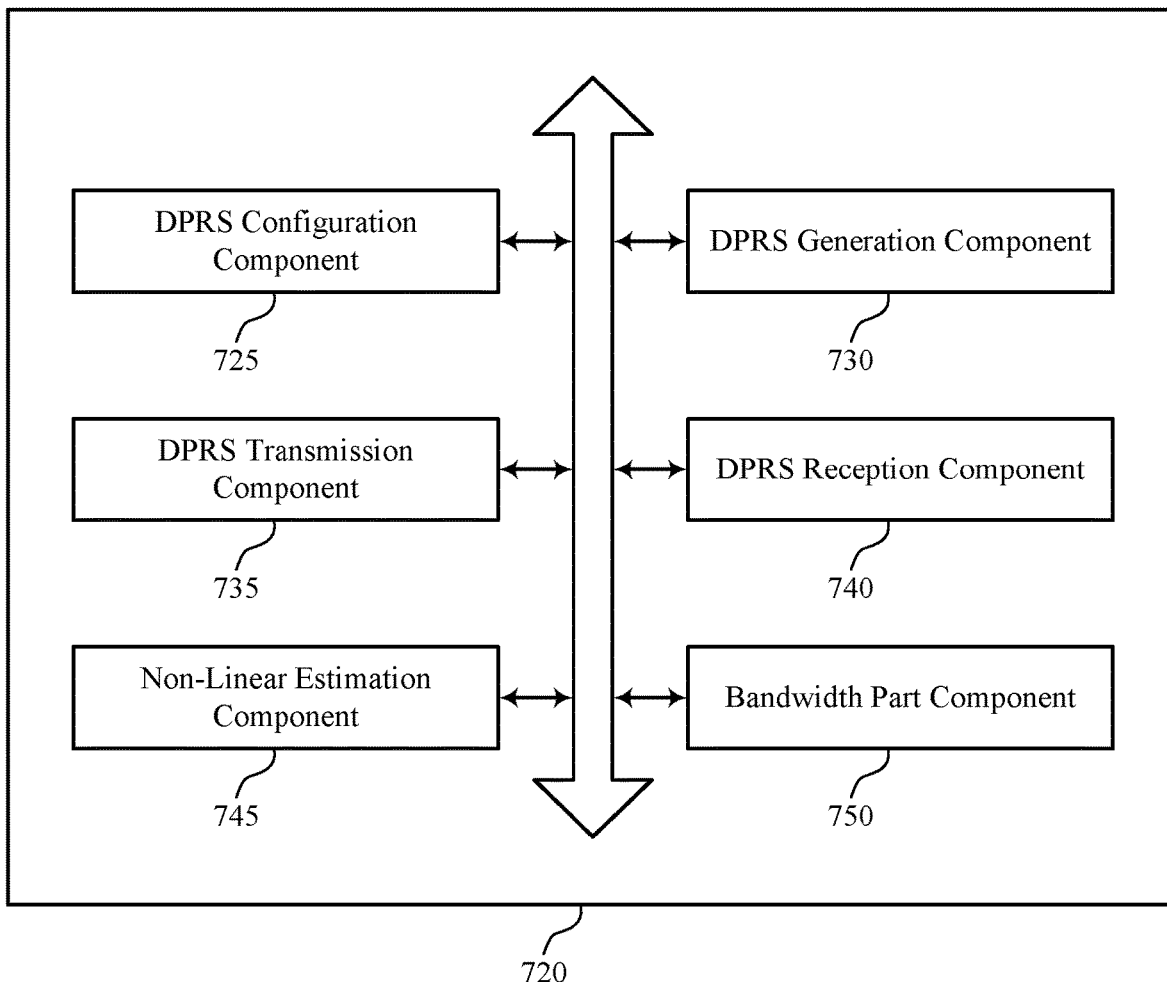
FIG. 7 shows a block diagram of a communications manager that supports configuring a distortion probing reference signal in accordance with aspects of the present disclosure.

FIG. 7 shows a block diagram 700 of a communications manager 720 that supports configuring a distortion probing reference signal in accordance with aspects of the present disclosure. The communications manager 720 may be an example of aspects of a communications manager 520, a communications manager 620, or both, as described herein. The communications manager 720, or various components thereof, may be an example of means for performing various aspects of distortion probing reference signal configuration as described herein. For example, the communications manager 720 may include an DPRS configuration component 725, an DPRS generation component 730, an DPRS transmission component 735, an DPRS reception component 740, a non-linear estimation component 745, a bandwidth part component 750, or any combination thereof. Each of these components may communicate, directly or indirectly, with one another (e.g., via one or more buses).

The communications manager 720 may support wireless communication at a transmitting device in accordance with examples as disclosed herein. The DPRS configuration component 725 may be configured to provide or support a means for determining a configuration for a distortion probing reference signal. The DPRS generation component 730 may be configured to provide or support a means for generating, based on the configuration, the distortion probing reference signal using a sequence associated with a peak-to-average power ratio, where a transmission component at the transmitting device operates in a non-linear operating region based on the peak-to-average power ratio. The DPRS transmission component 735 may be configured to provide or support a means for transmitting the generated distortion probing reference signal, the distortion probing reference signal associated with the peak-to-average power ratio.

In some examples, the non-linear estimation component 745 may be configured to provide or support a means for determining a non-linear response of the transmission component based on the distortion probing reference signal.

In some examples, the DPRS configuration component 725 may be configured to provide or support a means for receiving an indication of a waveform type for the distortion probing reference signal, where the configuration for the distortion probing reference signal is based on the waveform type.

In some examples, the indication of the waveform type is received in a system information message, a medium access control channel element, a downlink control information message, a radio resource control message, a random access channel message, or any combination thereof.

In some examples, the DPRS generation component 730 may be configured to provide or support a means for selecting a waveform type for the distortion probing reference signal, where the configuration for the distortion probing reference signal is based on the waveform type. In some examples, the DPRS transmission component 735 may be configured to provide or support a means for indicating, to a receiving device, the waveform type selected by the transmitting device.

In some examples, to indicate the waveform type, the DPRS transmission component 735 may be configured to provide or support a means for transmitting an indication of the waveform type in a system information message, a medium access control channel element, a downlink control information message, a radio resource control message, a random access channel message, or any combination thereof.

In some examples, to indicate the waveform type, the DPRS transmission component 735 may be configured to provide or support a means for transmitting an indication of the waveform type in a random access channel message, an uplink control information message, or any combination thereof.

In some examples, the DPRS configuration component 725 may be configured to provide or support a means for determining a first waveform type for signals transmitted using a data channel, a second waveform type for signals transmitted using a control channel, or both, where the configuration for the distortion probing reference signal is based on the first waveform type or the second waveform type.

In some examples, the DPRS configuration component 725 may be configured to provide or support a means for determining a first numerology for signals transmitted using a data channel in a bandwidth part, a second numerology for signals transmitted using a control channel in the bandwidth part, a third numerology for reference signals transmitted in the bandwidth part, or any combination thereof, where the configuration for the distortion probing reference signal is based on the first numerology, the second numerology, or the third.

In some examples, the bandwidth part component 750 may be configured to provide or support a means for activating a first bandwidth part and a second bandwidth part for communications. In some examples, the DPRS configuration component 725 may be configured to provide or support a means for determining a first numerology for signals transmitted using a data channel in the first bandwidth part, a second numerology for signals transmitted using a control channel in the first bandwidth part, a third numerology for reference signals transmitted in the first bandwidth part, or any combination thereof, where the configuration for the distortion probing reference signal is based on the first numerology, the second numerology, or the third numerology, and the distortion probing reference signal is transmitted in the first bandwidth part.

In some examples, the first numerology associated with the first bandwidth part is different from the second numerology associated with the second bandwidth part.

In some examples, the bandwidth part component 750 may be configured to provide or support a means for activating a first bandwidth part and a second bandwidth part for communications. In some examples, the DPRS configuration component 725 may be configured to provide or support a means for determining a first numerology for signals transmitted using a data channel in the first bandwidth part, a second numerology for signals transmitted using a control channel in the first bandwidth part, a third numerology for reference signals transmitted in the first bandwidth part, or any combination thereof. In some examples, the DPRS configuration component 725 may be configured to provide or support a means for determining a fourth numerology for signals transmitted using the data channel in the second bandwidth part, a fifth numerology for signals transmitted using the control channel in the second bandwidth part, a sixth numerology for reference signals transmitted in the second bandwidth part, or any combination thereof. In some examples, the DPRS configuration component 725 may be configured to provide or support a means for where the configuration for the distortion probing reference signal is based on the first numerology, the second numerology, the third numerology, the fourth numerology, the fifth numerology, or the sixth numerology. In some examples, the DPRS transmission component 735 may be configured to provide or support a means for where transmitting the distortion probing reference signal includes transmitting a first component of the distortion probing reference signal based on the first numerology, the second numerology, or the third numerology for transmission in the first bandwidth part, and transmitting a second component of the distortion probing reference signal based on the fourth numerology, the fifth numerology, or the sixth numerology for transmission in the second bandwidth part.

In some examples, the DPRS configuration component 725 may be configured to provide or support a means for determining a synchronization signal block index configured for a receiving device, where the configuration for the distortion probing reference signal is based on the synchronization signal block index and the distortion probing reference signal is transmitted using a transmission spatial domain filter corresponding to the synchronization signal block index.

In some examples, the DPRS configuration component 725 may be configured to provide or support a means for determining a first correspondence between a control channel and a first reference signal, a second correspondence between a data channel and a second reference signal, or both based on a transmission configuration indicator.

In some examples, the DPRS transmission component 735 may be configured to provide or support a means for indicating, to a receiving device, that the first reference signal corresponds to the distortion probing reference signal based on the first correspondence between the control channel and the first reference signal. In some examples, the DPRS transmission component 735 may be configured to provide or support a means for indicating, to the receiving device, that the second reference signal corresponds to the distortion probing reference signal based on the second correspondence between the data channel and the second reference signal.

In some examples, the DPRS transmission component 735 may be configured to provide or support a means for indicating, to a receiving device, a third correspondence between the distortion probing reference signal and a third reference signal.

In some examples, the DPRS configuration component 725 may be configured to provide or support a means for determining a first set of spatial filtering coefficients for signals transmitted using a data channel, a second set of spatial filtering coefficients for signals transmitted using a control channel, or both, where the configuration for the distortion probing reference signal is based on the first set of spatial filtering coefficients or the second set of spatial filtering coefficients.

In some examples, the DPRS configuration component 725 may be configured to provide or support a means for determining a set of one or more spatial filtering coefficients for signals transmitted using a random access channel, where the configuration for the distortion probing reference signal is based on the set of spatial filtering coefficients.

In some examples, the DPRS configuration component 725 may be configured to provide or support a means for receiving an indication of a set of one or more spatial filtering coefficients for the distortion probing reference signal, where the configuration for the distortion probing reference signal is based on the set of spatial filtering coefficients.

The communications manager 720 may support wireless communication at a receiving device in accordance with examples as disclosed herein. In some examples, the DPRS configuration component 725 may be configured to provide or support a means for determining a configuration for a distortion probing reference signal. The DPRS reception component 740 may be configured to provide or support a means for receiving, based on the configuration, the distortion probing reference signal from a transmitting device, the distortion probing reference signal including a peak-to-average power ratio associated with a non-linear operating region of a transmitting component. The non-linear estimation component 745 may be configured to provide or support a means for determining a non-linear response of a transmission component of the transmitting device based on the distortion probing reference signal.

In some examples, the DPRS reception component 740 may be configured to provide or support a means for transmitting an indication of a waveform type for the distortion probing reference signal, where the configuration for the distortion probing reference signal is based on the waveform type.

In some examples, the DPRS reception component 740 may be configured to provide or support a means for receiving an indication of a waveform type for the distortion probing reference signal, where the configuration for the distortion probing reference signal is based on the waveform type.

In some examples, the DPRS configuration component 725 may be configured to provide or support a means for determining a first waveform type for signals transmitted using a data channel, a second waveform type for signals transmitted using a control channel, or both, where the configuration for the distortion probing reference signal is based on the first waveform type or the second waveform type.

In some examples, the DPRS configuration component 725 may be configured to provide or support a means for determining a first numerology for signals transmitted using a data channel in a bandwidth part, a second numerology for signals transmitted using a control channel in the bandwidth part, a third numerology for reference signals transmitted in the bandwidth part, or any combination thereof, where the configuration for the distortion probing reference signal is based on the first numerology, the second numerology, or the third numerology.

In some examples, the bandwidth part component 750 may be configured to provide or support a means for activating a first bandwidth part and a second bandwidth part for communications. In some examples, the DPRS configuration component 725 may be configured to provide or support a means for determining a first numerology for signals transmitted using a data channel in the first bandwidth part, a second numerology for signals transmitted using a control channel in the first bandwidth part, a third numerology for reference signals transmitted in the first bandwidth part, or any combination thereof, where the configuration for the distortion probing reference signal is based on the first numerology, the second numerology, or the third numerology, and the distortion probing reference signal is received in the first bandwidth part.

In some examples, the bandwidth part component 750 may be configured to provide or support a means for activating a first bandwidth part and a second bandwidth part for communications. In some examples, the DPRS configuration component 725 may be configured to provide or support a means for determining a first numerology for signals transmitted using a data channel in the first bandwidth part, a second numerology for signals transmitted using a control channel in the first bandwidth part, a third numerology for reference signals transmitted in the first bandwidth part, or any combination thereof. In some examples, the DPRS configuration component 725 may be configured to provide or support a means for determining a fourth numerology for signals transmitted using the data channel in the second bandwidth part, a fifth numerology for signals transmitted using the control channel in the second bandwidth part, a sixth numerology for reference signals transmitted in the second bandwidth part, or any combination thereof, where the configuration for the distortion probing reference signal is based on the first numerology, the second numerology, the third numerology, the fourth numerology, the fifth numerology, or the sixth numerology.

In some examples, the DPRS configuration component 725 may be configured to provide or support a means for identifying a synchronization signal block index corresponding to a transmission spatial domain filter. In some examples, the DPRS reception component 740 may be configured to provide or support a means for where the distortion probing reference signal is received based on a quasi-colocation between signals transmitted during the synchronization signal block index and the distortion probing reference signal.

In some examples, the DPRS configuration component 725 may be configured to provide or support a means for determining a first correspondence between a control channel and a first reference signal, a second correspondence between a data channel and a second reference signal, or both based on a transmission configuration indicator.

In some examples, the DPRS configuration component 725 may be configured to provide or support a means for determining that the first reference signal corresponds to the distortion probing reference signal based on the first correspondence between the control channel and the first reference signal. In some examples, the DPRS configuration component 725 may be configured to provide or support a means for determining that the second reference signal corresponds to the distortion probing reference signal based on the second correspondence between the data channel and the first reference signal.

In some examples, the DPRS configuration component 725 may be configured to provide or support a means for receiving an indication of a third correspondence between the distortion probing reference signal and a third reference signal.

In some examples, the DPRS configuration component 725 may be configured to provide or support a means for determining a first set of spatial filtering coefficients for signals transmitted using a data channel, a second set of spatial filtering coefficients for signals transmitted using a control channel, a third set of spatial filtering coefficients for signal transmitted using a random access channel, or any combination thereof, where the configuration for the distortion probing reference signal is based on the first set of spatial filtering coefficients, the second set of spatial filtering coefficients, or the third set of spatial filtering coefficients.

In some examples, the DPRS reception component 740 may be configured to provide or support a means for indicating a set of one or more spatial filtering coefficients for the distortion probing reference signal, where the configuration for the distortion probing reference signal is based on the set of spatial filtering coefficients.

Figure 8:
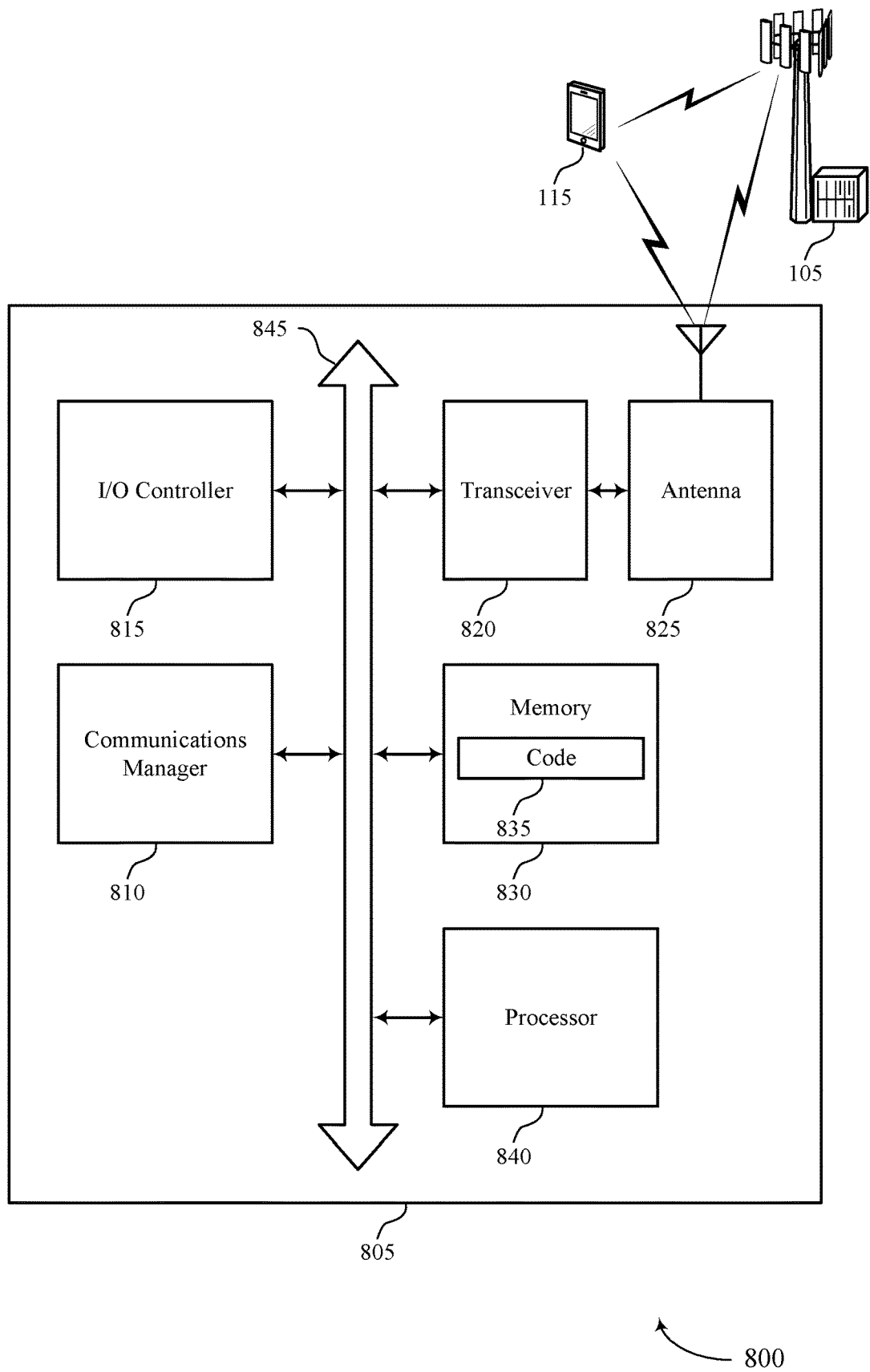
FIGS. 8 and 9 show diagrams of systems including a device that supports configuring a distortion probing reference signal in accordance with aspects of the present disclosure.

FIG. 8 shows a diagram of a system 800 including a device 805 that supports configuring a distortion probing reference signal in accordance with aspects of the present disclosure. The device 805 may be an example of or include the components of device 605 or a UE 115 as described herein. The device 805 may communicate wirelessly with one or more base stations 105, UEs 115, or any combination thereof. The device 805 may include components for bi-directional voice and data communications including components for transmitting and receiving communications, including a communications manager 810, a I/O controller 815, a transceiver 820, an antenna 825, a memory 830, a code 835, and a processor 840. These components may be in electronic communication or otherwise coupled (e.g., operatively, communicatively, functionally, electronically, electrically) via one or more buses (e.g., bus 845).

The I/O controller 815 may manage input and output signals for device 805. The I/O controller 815 may also manage peripherals not integrated into device 805. In some cases, the I/o controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with device 805 via the I/O controller 815 or via hardware components controlled by the I/O controller 815.

In some cases, the device 805 may include a single antenna 825. However, in some cases the device may have more than one antenna 825, which may be capable of concurrently transmitting or receiving multiple wireless transmissions. The transceiver 820 may communicate bi-directionally, via the one or more antennas 825, wired, or wireless links as described herein. For example, the transceiver 820 may represent a wireless transceiver and may communicate bi-directionally with another wireless transceiver. The transceiver 820 may also include a modem to modulate the packets and provide the modulated packets to one or more antennas 825 for transmission, and to demodulate packets received from the one or more antennas 825. The transceiver 820, or the transceiver 820 and one or more antennas 825, may be an example of a transmitter 515, a transmitter 615, a receiver 510, a receiver 610, or any combination thereof or component thereof, as described herein.

The memory 830 may include random-access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or other type of memory. In some cases, the code 835 may not be directly executable by the processor 840 but may cause a computer (e.g., when compiled and executed) to perform functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting distortion probing reference signal configuration).

The communications manager 810 may support wireless communication at a transmitting device in accordance with examples as disclosed herein. For example, the communications manager 810 may be configured to provide or support a means for determining a configuration for a distortion probing reference signal. The communications manager 810 may be configured to provide or support a means for generating, basing at least in part on the configuration, the distortion probing reference signal using a sequence associated with a peak-to-average power ratio, where a transmission component at the transmitting device operates in a non-linear operating region based on the peak-to-average power ratio. The communications manager 810 may be configured to provide or support a means for transmitting the generated distortion probing reference signal, the distortion probing reference signal associated with the peak-to-average power ratio.

The communications manager 810 may support wireless communication at a receiving device in accordance with examples as disclosed herein. For example, the communications manager 810 may be configured to provide or support a means for determining a configuration for a distortion probing reference signal. The communications manager 810 may be configured to provide or support a means for receiving, based on the configuration, the distortion probing reference signal from a transmitting device, the distortion probing reference signal including a peak-to-average power ratio associated with a non-linear operating region of a transmitting component. The communications manager 810 may be configured to provide or support a means for determining a non-linear response of a transmission component of the transmitting device based on the distortion probing reference signal.

By including or configuring the communications manager 810 in accordance with examples as described herein, the device 805 may support improved techniques for determining a non-linear response of transmission components at the device 805 or another device, enabling increased utilization of transmission components at the device 805 or other device.

In some examples, the communications manager 810 may be configured to perform various operations (e.g., receiving, monitoring, transmitting) using or otherwise in cooperation with the transceiver 820, the one or more antennas 825, or any combination thereof. Although the communications manager 810 is illustrated as a separate component, in some examples, one or more functions described with reference to the communications manager 810 may be supported by or performed by the processor 840, the memory 830, the code 835, or any combination thereof. For example, the code 835 may include instructions executable by the processor 840 to cause the device 805 to perform various aspects of distortion probing reference signal configuration as described herein, or the processor 840 and the memory 830 may be otherwise configured to perform or support such operations.

Figure 9:
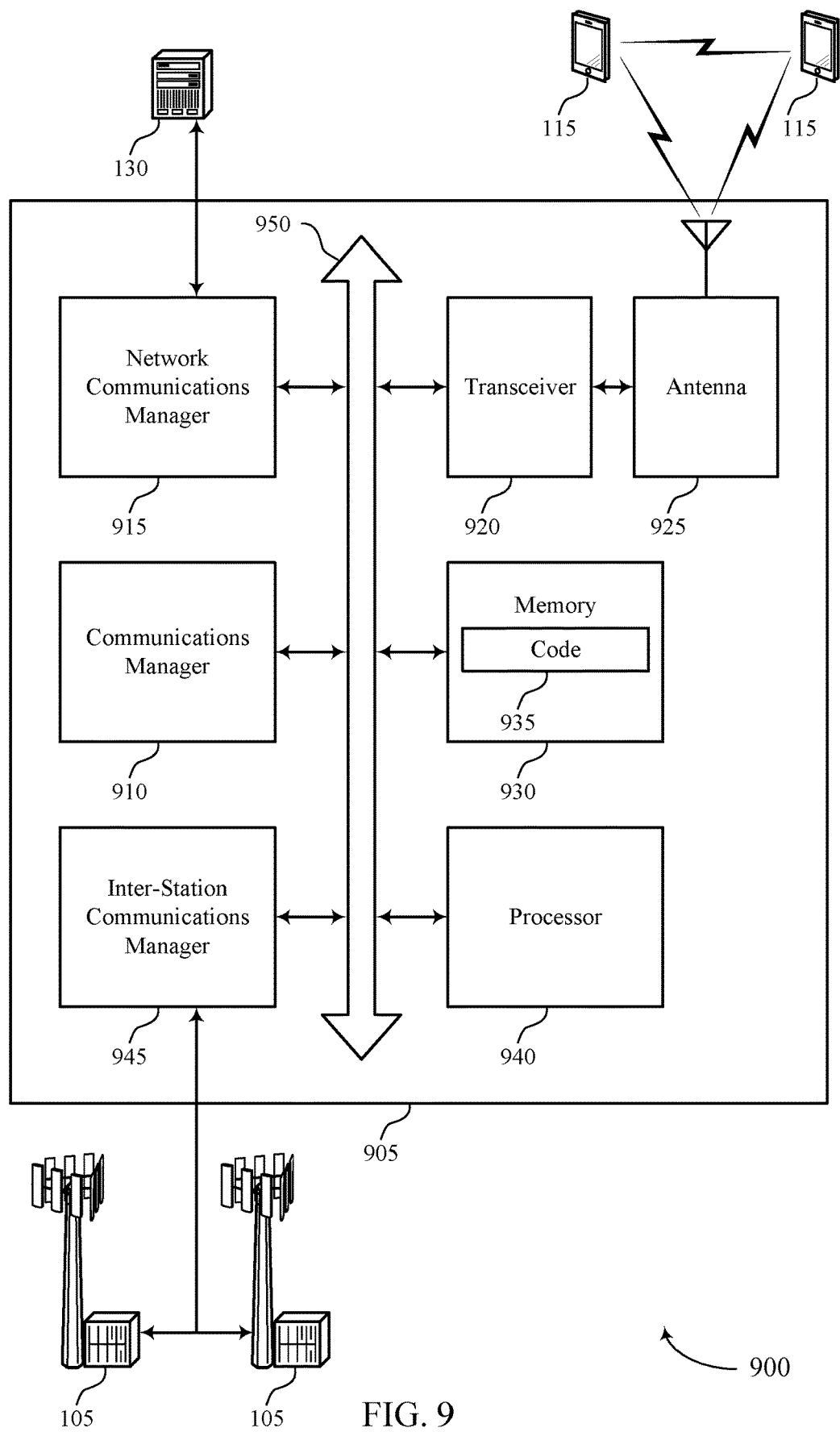

FIG. 9 shows a diagram of a system 900 including a device 905 that supports configuring a distortion probing reference signal in accordance with aspects of the present disclosure. The device 905 may be an example of or include the components of device 605 or a base station 105 as described herein. The device 905 may communicate wirelessly with one or more base stations 105, UEs 115, or any combination thereof. The device 905 may include components for bi-directional voice and data communications including components for transmitting and receiving communications, including a communications manager 910, a network communications manager 915, a transceiver 920, an antenna 925, a memory 930, a code 935, a processor 940, and an inter-station communications manager 945. These components may be in electronic communication or otherwise coupled (e.g., operatively, communicatively, functionally, electronically, electrically) via one or more buses (e.g., bus 950).

The network communications manager 915 may manage communications with the core network (e.g., via one or more wired backhaul links). For example, the network communications manager 915 may manage the transfer of data communications for client devices, such as one or more UEs 115.

In some cases, the device 905 may include a single antenna 925. However, in some cases the device may have more than one antenna 925, which may be capable of concurrently transmitting or receiving multiple wireless transmissions. The transceiver 920 may communicate bi-directionally, via the one or more antennas 925, wired, or wireless links as described herein. For example, the transceiver 920 may represent a wireless transceiver and may communicate bi-directionally with another wireless transceiver. The transceiver 920 may also include a modem to modulate the packets and provide the modulated packets to one or more antennas 925 for transmission, and to demodulate packets received from the one or more antennas 925. The transceiver 920, or the transceiver 920 and one or more antennas 925, may be an example of a transmitter 515, a transmitter 615, a receiver 510, a receiver 610, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or other type of memory. In some cases, the code 935 may not be directly executable by the processor 940 but may cause a computer (e.g., when compiled and executed) to perform functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting distortion probing reference signal configuration).

The inter-station communications manager 945 may manage communications with other base station 105 and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communication network technology to provide communication between base stations 105.

The communications manager 910 may support wireless communication at a transmitting device in accordance with examples as disclosed herein. For example, the communications manager 910 may be configured to provide or support a means for determining a configuration for a distortion probing reference signal. The communications manager 910 may be configured to provide or support a means for generating, basing at least in part on the configuration, the distortion probing reference signal using a sequence associated with a peak-to-average power ratio, where a transmission component at the transmitting device operates in a non-linear operating region based on the peak-to-average power ratio. The communications manager 910 may be configured to provide or support a means for transmitting the generated distortion probing reference signal, the distortion probing reference signal associated with the peak-to-average power ratio.

The communications manager 910 may support wireless communication at a receiving device in accordance with examples as disclosed herein. For example, the communications manager 910 may be configured to provide or support a means for determining a configuration for a distortion probing reference signal. The communications manager 910 may be configured to provide or support a means for receiving, based on the configuration, the distortion probing reference signal from a transmitting device, the distortion probing reference signal including a peak-to-average power ratio associated with a non-linear operating region of a transmitting component. The communications manager 910 may be configured to provide or support a means for determining a non-linear response of a transmission component of the transmitting device based on the distortion probing reference signal.

By including or configuring the communications manager 910 in accordance with examples as described herein, the device 905 may support improved techniques for the device 805 may support improved techniques for determining a non-linear response of transmission components at the device 905 or another device, enabling increased utilization of transmission components at the device 905 or other device.

In some examples, the communications manager 910 may be configured to perform various operations (e.g., receiving, monitoring, transmitting) using or otherwise in cooperation with the transceiver 920, the one or more antennas 925, or any combination thereof. Although the communications manager 910 is illustrated as a separate component, in some examples, one or more functions described with reference to the communications manager 910 may be supported by or performed by the processor 940, the memory 930, the code 935, or any combination thereof. For example, the code 935 may include instructions executable by the processor 940 to cause the device 905 to perform various aspects of distortion probing reference signal configuration as described herein, or the processor 940 and the memory 930 may be otherwise configured to perform or support such operations.

Figure 10:
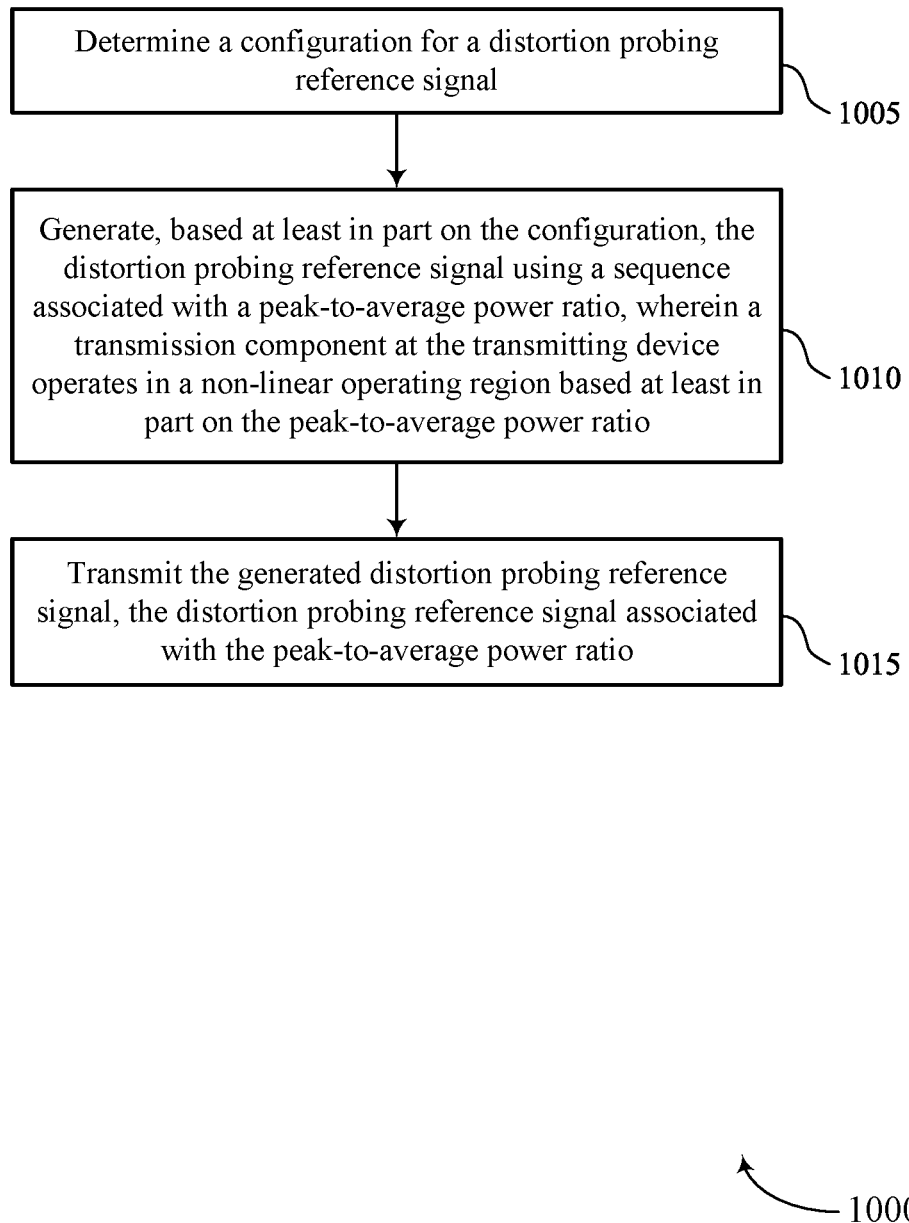
FIGS. 10 and 11 show flowcharts illustrating methods that support distortion probing reference signal configuration in accordance with aspects of the present disclosure.

FIG. 10 shows a flowchart illustrating a method 1000 for distortion probing reference signal configuration in accordance with aspects of the present disclosure. The operations of method 1000 may be implemented by a UE or a base station or its components as described herein. For example, the operations of method 1000 may be performed by a UE 115 or a base station 105 as described with reference to FIGS. 1 through 9. In some examples, a UE or a base station may execute a set of instructions to control the functional elements of the device to perform the described functions. Additionally, or alternatively, the UE or the base station may perform aspects of the described functions using special-purpose hardware.

At 1005, the method may include determining a configuration for a distortion probing reference signal. The operations of 1005 may be performed according to the methods described herein. In some examples, aspects of the operations of 1005 may be performed by an DPRS configuration component 725 as described with reference to FIG. 7.

At 1010, the method may include generating, based at least in part on the configuration, the distortion probing reference signal using a sequence associated with a peak-to-average power ratio, wherein a transmission component at the transmitting device operates in a non-linear operating region based at least in part on the peak-to-average power ratio. The operations of 1010 may be performed according to the methods described herein. In some examples, aspects of the operations of 1010 may be performed by an DPRS generation component 730 as described with reference to FIG. 7.

At 1015, the method may include transmitting the generated distortion probing reference signal, the distortion probing reference signal associated with the peak-to-average power ratio. The operations of 1015 may be performed according to the methods described herein. In some examples, aspects of the operations of 1015 may be performed by an DPRS transmission component 735 as described with reference to FIG. 7.

Figure 11:
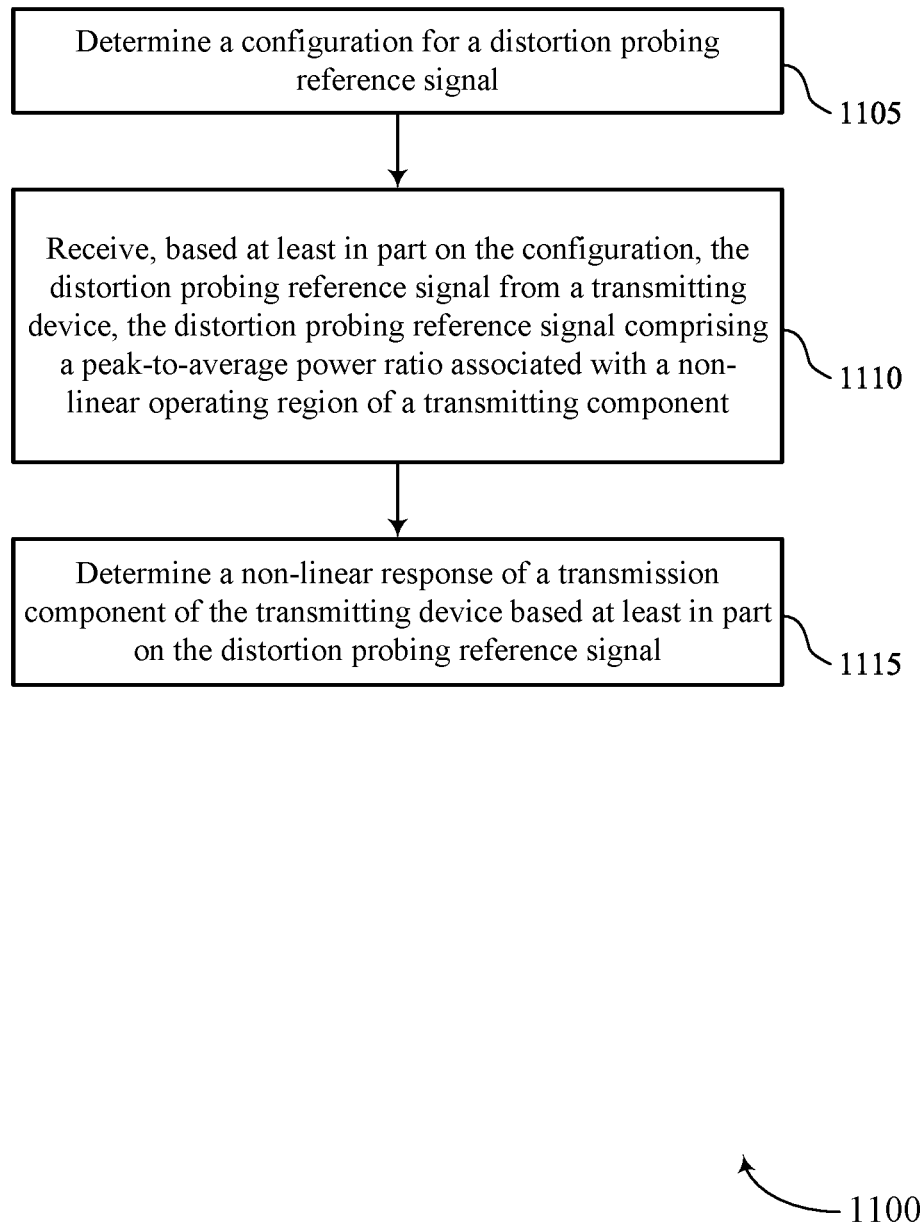

FIG. 11 shows a flowchart illustrating a method 1100 for distortion probing reference signal configuration in accordance with aspects of the present disclosure. The operations of method 1100 may be implemented by a UE or a base station or its components as described herein. For example, the operations of method 1100 may be performed by a UE 115 or a base station 105 as described with reference to FIGS. 1 through 9. In some examples, a UE or a base station may execute a set of instructions to control the functional elements of the device to perform the described functions.

Additionally, or alternatively, the UE or the base station may perform aspects of the described functions using special-purpose hardware.

At 1105, the method may include determining a configuration for a distortion probing reference signal. The operations of 1105 may be performed according to the methods described herein. In some examples, aspects of the operations of 1105 may be performed by an DPRS configuration component 725 as described with reference to FIG. 7.

At 1110, the method may include receiving, based at least in part on the configuration, the distortion probing reference signal from a transmitting device, the distortion probing reference signal comprising a peak-to-average power ratio associated with a non-linear operating region of a transmitting component. The operations of 1110 may be performed according to the methods described herein. In some examples, aspects of the operations of 1110 may be performed by an DPRS reception component 740 as described with reference to FIG. 7.

At 1115, the method may include determining a non-linear response of a transmission component of the transmitting device based at least in part on the distortion probing reference signal. The operations of 1115 may be performed according to the methods described herein. In some examples, aspects of the operations of 1115 may be performed by a non-linear estimation component 745 as described with reference to FIG. 7.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

- Aspect 1: A method for wireless communication at a transmitting device, comprising: determining a configuration for a distortion probing reference signal; generating, based at least in part on the configuration, the distortion probing reference signal using a sequence associated with a peak-to-average power ratio, wherein a transmission component at the transmitting device operates in a non-linear operating region based at least in part on the peak-to-average power ratio; transmitting the generated distortion probing reference signal, the distortion probing reference signal associated with the peak-to-average power ratio.
- Aspect 2: The method of aspect 1, further comprising: determining a non-linear response of the transmission component based at least in part on the distortion probing reference signal.
- Aspect 3: The method of any of aspects 1 through 2, further comprising: receiving an indication of a waveform type for the distortion probing reference signal, wherein the configuration for the distortion probing reference signal is based at least in part on the waveform type.
- Aspect 4: The method of aspect 3, wherein the indication of the waveform type is received in a system information message, a medium access control channel element, a downlink control information message, a radio resource control message, a random access channel message, or any combination thereof.
- Aspect 5: The method of any of aspects 1 through 4, further comprising: selecting a waveform type for the distortion probing reference signal, wherein the configuration for the distortion probing reference signal is based at least in part on the waveform type; and indicating, to a receiving device, the waveform type selected by the transmitting device.
- Aspect 6: The method of aspect 5, wherein indicating the waveform type comprises: transmitting an indication of the waveform type in a system information message, a medium access control channel element, a downlink control information message, a radio resource control message, a random access channel message, or any combination thereof.
- Aspect 7: The method of any of aspects 5 through 6, wherein indicating the waveform type comprises: transmitting an indication of the waveform type in a random access channel message, an uplink control information message, or any combination thereof.
- Aspect 8: The method of any of aspects 1 through 7, further comprising: determining a first waveform type for signals transmitted using a data channel, a second waveform type for signals transmitted using a control channel, or both, wherein the configuration for the distortion probing reference signal is based at least in part on the first waveform type or the second waveform type.
- Aspect 9: The method of any of aspects 1 through 7, further comprising: determining a first numerology for signals transmitted using a data channel in a bandwidth part, a second numerology for signals transmitted using a control channel in the bandwidth part, a third numerology for reference signals transmitted in the bandwidth part, or any combination thereof, wherein the configuration for the distortion probing reference signal is based at least in part on the first numerology, the second numerology, or the third.
- Aspect 10: The method of any of aspects 1 through 7, further comprising: activating a first bandwidth part and a second bandwidth part for communications; and determining a first numerology for signals transmitted using a data channel in the first bandwidth part, a second numerology for signals transmitted using a control channel in the first bandwidth part, a third numerology for reference signals transmitted in the first bandwidth part, or any combination thereof, wherein the configuration for the distortion probing reference signal is based at least in part on the first numerology, the second numerology, or the third numerology, and the distortion probing reference signal is transmitted in the first bandwidth part.
- Aspect 11: The method of aspect 10, wherein the first numerology associated with the first bandwidth part is different from the second numerology associated with the second bandwidth part.
- Aspect 12: The method of any of aspects 1 through 11, further comprising: activating a first bandwidth part and a second bandwidth part for communications; determining a first numerology for signals transmitted using a data channel in the first bandwidth part, a second numerology for signals transmitted using a control channel in the first bandwidth part, a third numerology for reference signals transmitted in the first bandwidth part, or any combination thereof; and determining a fourth numerology for signals transmitted using the data channel in the second bandwidth part, a fifth numerology for signals transmitted using the control channel in the second bandwidth part, a sixth numerology for reference signals transmitted in the second bandwidth part, or any combination thereof, wherein the configuration for the distortion probing reference signal is based at least in part on the first numerology, the second numerology, the third numerology, the fourth numerology, the fifth numerology, or the sixth numerology, and wherein transmitting the distortion probing reference signal comprises transmitting a first component of the distortion probing reference signal based at least in part on the first numerology, the second numerology, or the third numerology for transmission in the first bandwidth part, and transmitting a second component of the distortion probing reference signal based at least in part on the fourth numerology, the fifth numerology, or the sixth numerology for transmission in the second bandwidth part.

Aspect 13: The method of any of aspects 1 through 12, further comprising: determining a synchronization signal block index configured for a receiving device, wherein the configuration for the distortion probing reference signal is based at least in part on the synchronization signal block index and the distortion probing reference signal is transmitted using a transmission spatial domain filter corresponding to the synchronization signal block index.

Aspect 14: The method of any of aspects 1 through 13, further comprising: determining a first correspondence between a control channel and a first reference signal, a second correspondence between a data channel and a second reference signal, or both based at least in part on a transmission configuration indicator.

Aspect 15: The method of aspect 14, further comprising: indicating, to a receiving device, that the first reference signal corresponds to the distortion probing reference signal based at least in part on the first correspondence between the control channel and the first reference signal; or indicating, to the receiving device, that the second reference signal corresponds to the distortion probing reference signal based at least in part on the second correspondence between the data channel and the second reference signal.

Aspect 16: The method of any of aspects 14 through 15, further comprising: indicating, to a receiving device, a third correspondence between the distortion probing reference signal and a third reference signal.

Aspect 17: The method of any of aspects 1 through 16, further comprising: determining a first set of spatial filtering coefficients for signals transmitted using a data channel, a second set of spatial filtering coefficients for signals transmitted using a control channel, or both, wherein the configuration for the distortion probing reference signal is based at least in part on the first set of spatial filtering coefficients or the second set of spatial filtering coefficients.

Aspect 18: The method of any of aspects 1 through 17, further comprising: determining a set of one or more spatial filtering coefficients for signals transmitted using a random access channel, wherein the configuration for the distortion probing reference signal is based at least in part on the set of spatial filtering coefficients.

Aspect 19: The method of any of aspects 1 through 18, further comprising: receiving an indication of a set of one or more spatial filtering coefficients for the distortion probing reference signal, wherein the configuration for the distortion probing reference signal is based at least in part on the set of spatial filtering coefficients.

Aspect 20: A method for wireless communication at a receiving device, comprising: determining a configuration for a distortion probing reference signal; receiving, based at least in part on the configuration, the distortion probing reference signal from a transmitting device, the distortion probing reference signal comprising a peak-to-average power ratio associated with a non-linear operating region of a transmitting component; and determining a non-linear response of a transmission component of the transmitting device based at least in part on the distortion probing reference signal.

Aspect 21: The method of aspect 20, further comprising: transmitting an indication of a waveform type for the distortion probing reference signal, wherein the configuration for the distortion probing reference signal is based at least in part on the waveform type.

Aspect 22: The method of any of aspects 20 through 21, further comprising: receiving an indication of a waveform type for the distortion probing reference signal, wherein the configuration for the distortion probing reference signal is based at least in part on the waveform type.

Aspect 23: The method of any of aspects 20 through 22, further comprising: determining a first waveform type for signals transmitted using a data channel, a second waveform type for signals transmitted using a control channel, or both, wherein the configuration for the distortion probing reference signal is based at least in part on the first waveform type or the second waveform type.

Aspect 24: The method of any of aspects 20 through 23, further comprising: determining a first numerology for signals transmitted using a data channel in a bandwidth part, a second numerology for signals transmitted using a control channel in the bandwidth part, a third numerology for reference signals transmitted in the bandwidth part, or any combination thereof, wherein the configuration for the distortion probing reference signal is based at least in part on the first numerology, the second numerology, or the third numerology.

Aspect 25: The method of any of aspects 20 through 24, further comprising: activating a first bandwidth part and a second bandwidth part for communications; and determining a first numerology for signals transmitted using a data channel in the first bandwidth part, a second numerology for signals transmitted using a control channel in the first bandwidth part, a third numerology for reference signals transmitted in the first bandwidth part, or any combination thereof, wherein the configuration for the distortion probing reference signal is based at least in part on the first numerology, the second numerology, or the third numerology, and the distortion probing reference signal is received in the first bandwidth part.

Aspect 26: The method of any of aspects 20 through 25, further comprising: activating a first bandwidth part and a second bandwidth part for communications; determining a first numerology for signals transmitted using a data channel in the first bandwidth part, a second numerology for signals transmitted using a control channel in the first bandwidth part, a third numerology for reference signals transmitted in the first bandwidth part, or any combination thereof; and determining a fourth numerology for signals transmitted using the data channel in the second bandwidth part, a fifth numerology for signals transmitted using the control channel in the second bandwidth part, a sixth numerology for reference signals transmitted in the second bandwidth part, or any combination thereof, wherein the configuration for the distortion probing reference signal is based at least in part on the first numerology, the second numerology, the third numerology, the fourth numerology, the fifth numerology, or the sixth numerology.

Aspect 27: The method of any of aspects 20 through 26, further comprising: identifying a synchronization signal block index corresponding to a transmission spatial domain filter; wherein the distortion probing reference signal is received based at least in part on a quasi-colocation between signals transmitted during the synchronization signal block index and the distortion probing reference signal.

Aspect 28: The method of any of aspects 20 through 27, further comprising: determining a first correspondence between a control channel and a first reference signal, a second correspondence between a data channel and a second reference signal, or both based at least in part on a transmission configuration indicator.

Aspect 29: The method of aspect 28, further comprising: determining that the first reference signal corresponds to the distortion probing reference signal based at least in part on the first correspondence between the control channel and the first reference signal; or determining that the second reference signal corresponds to the distortion probing reference signal based at least in part on the second correspondence between the data channel and the first reference signal.

Aspect 30: The method of any of aspects 28 through 29, further comprising: receiving an indication of a third correspondence between the distortion probing reference signal and a third reference signal.

Aspect 31: The method of any of aspects 20 through 30, further comprising: determining a first set of spatial filtering coefficients for signals transmitted using a data channel, a second set of spatial filtering coefficients for signals transmitted using a control channel, a third set of spatial filtering coefficients for signal transmitted using a random access channel, or any combination thereof, wherein the configuration for the distortion probing reference signal is based at least in part on the first set of spatial filtering coefficients, the second set of spatial filtering coefficients, or the third set of spatial filtering coefficients.

Aspect 32: The method of any of aspects 20 through 31, further comprising: indicating a set of one or more spatial filtering coefficients for the distortion probing reference signal, wherein the configuration for the distortion probing reference signal is based at least in part on the set of spatial filtering coefficients.

Aspect 33: An apparatus for wireless communication at a transmitting device, comprising a processor; memory coupled with the processor; and instructions stored in the memory and executable by the processor to cause the apparatus to perform a method of any of aspects 1 through 19.

Aspect 34: An apparatus for wireless communication at a transmitting device, comprising at least one means for performing a method of any of aspects 1 through 19.

Aspect 35: A non-transitory computer-readable medium storing code for wireless communication at a transmitting device, the code comprising instructions executable by a processor to perform a method of any of aspects 1 through 19.

Aspect 36: An apparatus for wireless communication at a receiving device, comprising a processor; memory coupled with the processor; and instructions stored in the memory and executable by the processor to cause the apparatus to perform a method of any of aspects 20 through 32.

Aspect 37: An apparatus for wireless communication at a receiving device, comprising at least one means for performing a method of any of aspects 20 through 32.

Aspect 38: A non-transitory computer-readable medium storing code for wireless communication at a receiving device, the code comprising instructions executable by a processor to perform a method of any of aspects 20 through 32.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable read-only memory (EEPROM), flash memory, compact disk read only memory (CD-ROM) or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a transmitting device, comprising:
   a processor;
   memory coupled with the processor; and
   instructions stored in the memory and executable by the processor to cause the apparatus to:
      determine a configuration for a distortion probing reference signal;
      generate, based at least in part on the configuration, the distortion probing reference signal using a sequence associated with a peak-to-average power ratio, wherein a transmission component at the transmitting device operates in a non-linear operating region based at least in part on the peak-to-average power ratio; and
      transmit the generated distortion probing reference signal, the distortion probing reference signal associated with the peak-to-average power ratio.

2. The apparatus of claim 1, wherein the instructions are further executable by the processor to cause the apparatus to:
   determine a non-linear response of the transmission component based at least in part on the distortion probing reference signal.

3. The apparatus of claim 1, wherein the instructions are further executable by the processor to cause the apparatus to:
   receive an indication of a waveform type for the distortion probing reference signal, wherein the configuration for the distortion probing reference signal is based at least in part on the waveform type.

4. The apparatus of claim 3, wherein the indication of the waveform type is received in a system information message, a medium access control channel element, a downlink control information message, a radio resource control message, a random access channel message, or any combination thereof.

5. The apparatus of claim 1, wherein the instructions are further executable by the processor to cause the apparatus to:
   select a waveform type for the distortion probing reference signal, wherein the configuration for the distortion probing reference signal is based at least in part on the waveform type; and
   indicate, to a receiving device, the waveform type selected by the transmitting device.

6. The apparatus of claim 5, wherein, to indicate the waveform type, the instructions are further executable by the processor to cause the apparatus to:
   transmit an indication of the waveform type in a system information message, a medium access control channel element, a downlink control information message, a radio resource control message, a random access channel message, an uplink control information message, or any combination thereof.

7. The apparatus of claim 1, wherein the instructions are further executable by the processor to cause the apparatus to:
   determine a first waveform type for signals transmitted using a data channel, a second waveform type for signals transmitted using a control channel, or both, wherein the configuration for the distortion probing reference signal is based at least in part on the first waveform type or the second waveform type.

8. The apparatus of claim 1, wherein the instructions are further executable by the processor to cause the apparatus to:
   determine a first numerology for signals transmitted using a data channel in a bandwidth part, a second numerology for signals transmitted using a control channel in the bandwidth part, a third numerology for reference signals transmitted in the bandwidth part, or any combination thereof, wherein the configuration for the distortion probing reference signal is based at least in part on the first numerology, the second numerology, or the third numerology.

9. The apparatus of claim 1, wherein the instructions are further executable by the processor to cause the apparatus to:
activate a first bandwidth part and a second bandwidth part for communications; and
determine a first numerology for signals transmitted using a data channel in the first bandwidth part, a second numerology for signals transmitted using a control channel in the first bandwidth part, a third numerology for reference signals transmitted in the first bandwidth part, or any combination thereof, wherein:
the configuration for the distortion probing reference signal is based at least in part on the first numerology, the second numerology, or the third numerology, and
the distortion probing reference signal is transmitted in the first bandwidth part.

10. The apparatus of claim 1, wherein the instructions are further executable by the processor to cause the apparatus to:
activate a first bandwidth part and a second bandwidth part for communications;
determine a first numerology for signals transmitted using a data channel in the first bandwidth part, a second numerology for signals transmitted using a control channel in the first bandwidth part, a third numerology for reference signals transmitted in the first bandwidth part, or any combination thereof; and
determine a fourth numerology for signals transmitted using the data channel in the second bandwidth part, a fifth numerology for signals transmitted using the control channel in the second bandwidth part, a sixth numerology for reference signals transmitted in the second bandwidth part, or any combination thereof,
wherein the configuration for the distortion probing reference signal is based at least in part on the first numerology, the second numerology, the third numerology, the fourth numerology, the fifth numerology, or the sixth numerology, and
wherein to transmit the distortion probing reference signal, the instructions are further executable by the processor to cause the apparatus to:
transmit a first component of the distortion probing reference signal based at least in part on the first numerology, the second numerology, or the third numerology for transmission in the first bandwidth part; and
transmit a second component of the distortion probing reference signal based at least in part on the fourth numerology, the fifth numerology, or the sixth numerology for transmission in the second bandwidth part.

11. The apparatus of claim 1, wherein the instructions are further executable by the processor to cause the apparatus to:
determine a synchronization signal block index configured for a receiving device,
wherein the configuration for the distortion probing reference signal is based at least in part on the synchronization signal block index and the distortion probing reference signal is transmitted using a transmission spatial domain filter corresponding to the synchronization signal block index.

12. The apparatus of claim 1, wherein the instructions are further executable by the processor to cause the apparatus to:
determine a first correspondence between a control channel and a first reference signal, a second correspondence between a data channel and a second reference signal, or both based at least in part on a transmission configuration indicator.

13. The apparatus of claim 12, wherein the instructions are further executable by the processor to cause the apparatus to:
indicate, to a receiving device, that the first reference signal corresponds to the distortion probing reference signal based at least in part on the first correspondence between the control channel and the first reference signal; or
indicate, to the receiving device, that the second reference signal corresponds to the distortion probing reference signal based at least in part on the second correspondence between the data channel and the second reference signal.

14. The apparatus of claim 12, wherein the instructions are further executable by the processor to cause the apparatus to:
indicate, to a receiving device, a third correspondence between the distortion probing reference signal and a third reference signal.

15. The apparatus of claim 1, wherein the instructions are further executable by the processor to cause the apparatus to:
determine a first set of spatial filtering coefficients for signals transmitted using a data channel, a second set of spatial filtering coefficients for signals transmitted using a control channel, or both, wherein the configuration for the distortion probing reference signal is based at least in part on the first set of spatial filtering coefficients or the second set of spatial filtering coefficients.

16. The apparatus of claim 1, wherein the instructions are further executable by the processor to cause the apparatus to:
determine a set of one or more spatial filtering coefficients for signals transmitted using a random access channel,
wherein the configuration for the distortion probing reference signal is based at least in part on the set of one or more spatial filtering coefficients.

17. The apparatus of claim 1, wherein the instructions are further executable by the processor to cause the apparatus to:
receive an indication of a set of one or more spatial filtering coefficients for the distortion probing reference signal,
wherein the configuration for the distortion probing reference signal is based at least in part on the set of one or more spatial filtering coefficients.

18. A method for wireless communication, at a transmitting device, comprising:
determining a configuration for a distortion probing reference signal;
generating, based at least in part on the configuration, the distortion probing reference signal using a sequence associated with a peak-to-average power ratio, wherein a transmission component at the transmitting device operates in a non-linear operating region based at least in part on the peak-to-average power ratio; and
transmitting the generated distortion probing reference signal, the distortion probing reference signal associated with the peak-to-average power ratio.

19. The method of claim 18, further comprising:
determining a non-linear response of the transmission component based at least in part on the distortion probing reference signal.

20. The method of claim 18, further comprising:
receiving an indication of a waveform type for the distortion probing reference signal, wherein the configuration for the distortion probing reference signal is based at least in part on the waveform type.

21. The method of claim 20, wherein the indication of the waveform type is received in a system information message, a medium access control channel element, a downlink control information message, a radio resource control message, a random access channel message, or any combination thereof.

22. The method of claim 18, further comprising:
selecting a waveform type for the distortion probing reference signal, wherein the configuration for the distortion probing reference signal is based at least in part on the waveform type; and
indicating, to a receiving device, the waveform type selected by the transmitting device.

23. The method of claim 22, wherein indicating the waveform type further comprises:
transmitting an indication of the waveform type in a system information message, a medium access control channel element, a downlink control information message, a radio resource control message, a random access channel message, an uplink control information message, or any combination thereof.

24. The method of claim 18, further comprising:
determining a first waveform type for signals transmitted using a data channel, a second waveform type for signals transmitted using a control channel, or both,
wherein the configuration for the distortion probing reference signal is based at least in part on the first waveform type or the second waveform type.

25. The method of claim 18, further comprising:
determining a first numerology for signals transmitted using a data channel in a bandwidth part, a second numerology for signals transmitted using a control channel in the bandwidth part, a third numerology for reference signals transmitted in the bandwidth part, or any combination thereof,
wherein the configuration for the distortion probing reference signal is based at least in part on the first numerology, the second numerology, or the third numerology.

26. The method of claim 18, further comprising:
activating a first bandwidth part and a second bandwidth part for communications; and
determining a first numerology for signals transmitted using a data channel in the first bandwidth part, a second numerology for signals transmitted using a control channel in the first bandwidth part, a third numerology for reference signals transmitted in the first bandwidth part, or any combination thereof, wherein:
the configuration for the distortion probing reference signal is based at least in part on the first numerology, the second numerology, or the third numerology, and
the distortion probing reference signal is transmitted in the first bandwidth part.

27. The method of claim 18, further comprising:
activating a first bandwidth part and a second bandwidth part for communications;
determining a first numerology for signals transmitted using a data channel in the first bandwidth part, a second numerology for signals transmitted using a control channel in the first bandwidth part, a third numerology for reference signals transmitted in the first bandwidth part, or any combination thereof; and
determining a fourth numerology for signals transmitted using the data channel in the second bandwidth part, a fifth numerology for signals transmitted using the control channel in the second bandwidth part, a sixth numerology for reference signals transmitted in the second bandwidth part, or any combination thereof,
wherein the configuration for the distortion probing reference signal is based at least in part on the first numerology, the second numerology, the third numerology, the fourth numerology, the fifth numerology, or the sixth numerology, and
wherein transmitting the distortion probing reference signal further comprises:
transmitting a first component of the distortion probing reference signal based at least in part on the first numerology, the second numerology, or the third numerology for transmission in the first bandwidth part; and
transmitting a second component of the distortion probing reference signal based at least in part on the fourth numerology, the fifth numerology, or the sixth numerology for transmission in the second bandwidth part.

28. The method of claim 18, further comprising:
determining a synchronization signal block index configured for a receiving device,
wherein the configuration for the distortion probing reference signal is based at least in part on the synchronization signal block index and the distortion probing reference signal is transmitted using a transmission spatial domain filter corresponding to the synchronization signal block index.

29. An apparatus for wireless communication at a transmitting device, comprising:
means for determining a configuration for a distortion probing reference signal;
means for generating, based at least in part on the configuration, the distortion probing reference signal using a sequence associated with a peak-to-average power ratio, wherein a transmission component at the transmitting device operates in a non-linear operating region based at least in part on the peak-to-average power ratio; and
means for transmitting the generated distortion probing reference signal, the distortion probing reference signal associated with the peak-to-average power ratio.

30. A non-transitory computer-readable medium storing code for wireless communication at a transmitting device, the code comprising instructions executable by a processor to:
determine a configuration for a distortion probing reference signal;
generate, based at least in part on the configuration, the distortion probing reference signal using a sequence associated with a peak-to-average power ratio, wherein a transmission component at the transmitting device operates in a non-linear operating region based at least in part on the peak-to-average power ratio; and transmit the generated distortion probing reference signal, the distortion probing reference signal associated with the peak-to-average power ratio.

\* \* \* \* \*